US012780143B2

(12) United States Patent
Zeller

(10) Patent No.: US 12,780,143 B2
(45) Date of Patent: Nov. 3, 2026

(54) VEHICLE IMMOBILIZER TIMER BASED ON ELECTRONIC KEY LEARNING

(71) Applicant: Honda Motor Co., Ltd., Tokyo (JP)

(72) Inventor: Joel C. Zeller, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 367 days.

(21) Appl. No.: 18/747,920

(22) Filed: Jun. 19, 2024

(65) Prior Publication Data

US 2025/0388187 A1 Dec. 25, 2025

(51) Int. Cl.
*B60R 25/04* (2013.01)
*B60R 25/20* (2013.01)
*G07C 9/00* (2020.01)

(52) U.S. Cl.
CPC .............. *B60R 25/04* (2013.01); *B60R 25/20* (2013.01); *G07C 9/00309* (2013.01); *B60R 2025/0415* (2013.01); *G07C 2009/00531* (2013.01); *G07C 2009/00793* (2013.01); *G07C 2209/08* (2013.01)

(58) Field of Classification Search
None
See application file for complete search history.

(56) References Cited

U.S. PATENT DOCUMENTS 6,377,173 B1 * 4/2002 Desai ................. G07C 9/00674 340/426.36
6,380,842 B1 * 4/2002 Mattes .................. B60R 25/257 340/5.6
6,549,115 B1 * 4/2003 Daiss ...................... B60R 25/24 340/5.31
10,137,859 B2 * 11/2018 van Roermund ..... B60R 25/245
10,547,989 B2 * 1/2020 Yoshihara ....... H04M 1/724098
10,723,315 B2 * 7/2020 Ishikawa ................ B60R 25/10
11,074,773 B1 * 7/2021 Morris .................... B60L 53/63
11,110,891 B2 9/2021 Suda et al.
2005/0173987 A1 8/2005 Shii
(Continued)

FOREIGN PATENT DOCUMENTS

JP 2008273520 A 11/2008
JP 4406189 B2 1/2010
(Continued)

*Primary Examiner* — Fekadeselassie Girma
(74) *Attorney, Agent, or Firm* — Morgan Lincoln; American Honda Motor Co., Inc.

(57) ABSTRACT

An electronic device for vehicle immobilizer timer based on electronic key learning to facilitate anti-theft security of a vehicle is provided. The electronic device receives first information indicative of learning of an electronic key of the vehicle. The electronic device controls selection of a delay time of an operation mode of the vehicle, based on the first information. The electronic device controls the operation mode of the vehicle to be set in an immobilized state, based on the delay time and the first information. The circuitry detects whether a request of a user to mobilize the vehicle is received. The circuitry authenticates the user, based on the detection that the request is received. The electronic device controls the operation mode of the vehicle to be set in a mobilized state based on the expiry of the delay time or the authentication of the user.

20 Claims, 10 Drawing Sheets

(56) References Cited

U.S. PATENT DOCUMENTS

| | | | | | |
|---|---|---|---|---|---|
| 2006/0017550 | A1* | 1/2006 | Yoshida | B60R 25/1018 | 340/426.11 |
| 2006/0232131 | A1* | 10/2006 | Endo | B60R 25/043 | 307/10.2 |
| 2009/0309696 | A1* | 12/2009 | Tsuruta | B60R 25/04 | 340/5.22 |
| 2010/0019925 | A1* | 1/2010 | Biondo | B60R 25/00 | 340/8.1 |
| 2010/0191392 | A1* | 7/2010 | Juzswik | B60R 25/245 | 701/2 |
| 2015/0116079 | A1* | 4/2015 | Mishra | G07C 9/257 | 340/5.52 |
| 2016/0098870 | A1* | 4/2016 | Bergerhoff | H04W 4/48 | 340/5.61 |
| 2019/0047512 | A1* | 2/2019 | Gersabeck | B60R 25/24 | |
| 2019/0147678 | A1* | 5/2019 | Saiki | B60R 25/24 | 340/5.64 |
| 2020/0339067 | A1* | 10/2020 | Kim | H04L 67/125 | |
| 2025/0018897 | A1* | 1/2025 | Saitou | B60R 25/24 | |
| 2026/0225429 | A1* | 8/2026 | Thornton | B60H 1/00978 | |

FOREIGN PATENT DOCUMENTS

| | | | |
|---|---|---|---|
| JP | 4510604 | B2 | 7/2010 |
| JP | 4521904 | B2 | 8/2010 |
| JP | 6060761 | B2 | 1/2017 |
| WO | 2019042594 | A1 | 3/2019 |

* cited by examiner

VEHICLE IMMOBILIZER TIMER BASED ON ELECTRONIC KEY LEARNING

BACKGROUND

Automotive theft is a growing and notorious crime that has proliferated across the global. With the advancements in technology, various vehicle security features and techniques have been developed. Typical vehicle security features may include, for example, mechanical locks and alarm systems. Mechanical locks, such as, steering wheel locks and gear-shift locks, may serve as physical obstacles to prevent theft and/or stall the thief. On the other hand, alarm systems with sensors may detect illicit entry or tampering with the vehicle. On the detection of the illicit entry or tampering, the alarm systems may generate loud sound to notify the owner and/or any nearby person about a possibility of vehicle theft. However, thieves are continually devising new ways to circumvent the vehicle security measures. For example, the thieves may use advanced hacking tools to bypass electrical systems and keyless entry signal amplifiers to gain illicit access to the vehicle. Thus, there is a need for an improved automobile theft prevention technology to effectively combat the developing vehicle theft methods.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, an electronic device is provided. The electronic device may include a circuitry. The circuitry may receive a first information associated with a vehicle. The first information is indicative of a learning of an electronic key associated with the vehicle. The circuitry may control a selection of a delay time associated with an operation mode of the vehicle, based on the received first information. The circuitry may control the operation mode of the vehicle to be set in an immobilized state, based on the delay time and the received first information. The circuitry may detect whether a request of a user associated with the vehicle to mobilize the vehicle is received, based on the operation mode of the vehicle being set as the immobilized state. The circuitry may authenticate the user, based on the detection that the request of the user associated with the vehicle is received. The circuitry may control the operation mode of the vehicle to be set in a mobilized state, based on at least one of expiry of the delay time or the authentication of the user.

According to another embodiment of the disclosure, a vehicle is provided. The vehicle may include an electronic control unit (ECU). The ECU may receive the first information associated with the vehicle. The first information is indicative of the learning of the new electronic key associated with the vehicle. The ECU may control the selection of the delay time associated with the operation mode of the vehicle, based on the received first information. The ECU may control the operation mode of the vehicle to be set in the immobilized state based on the delay time and the received first information. The ECU may detect whether the request of the user associated with the vehicle to mobilize the vehicle is received, based on the operation mode of the vehicle being set as the immobilized state. The ECU may authenticate the user, based on the detection of the received request of the user associated with the vehicle. The ECU may control the operation mode of the vehicle to be set in the mobilized state, based on the at least one of the expiry of the delay time or the authentication of the user.

According to another embodiment of the disclosure, a server is provided. The server may include the circuitry. The circuitry may determine the first information associated with the vehicle. The first information is indicative of the learning of the new electronic key associated with the vehicle. The vehicle is being further associated with the server. The circuitry may select the delay time associated with the operation mode of the vehicle, based on the determined first information. The circuitry may control the operation mode of the vehicle to be set in the immobilized state, based on the selected delay time and the determined first information. The circuitry may detect whether the request of the user associated with the vehicle to mobilize the vehicle is received, based on the operation mode of the vehicle being set as the immobilized state. The circuitry may authenticate the user, based on the detection of the request of the user associated with the vehicle being received. The circuitry may control the operation mode of the vehicle to be set in the mobilized state, based on the at least one of the expiry of the delay time or the authentication of the user.

Figure 1:
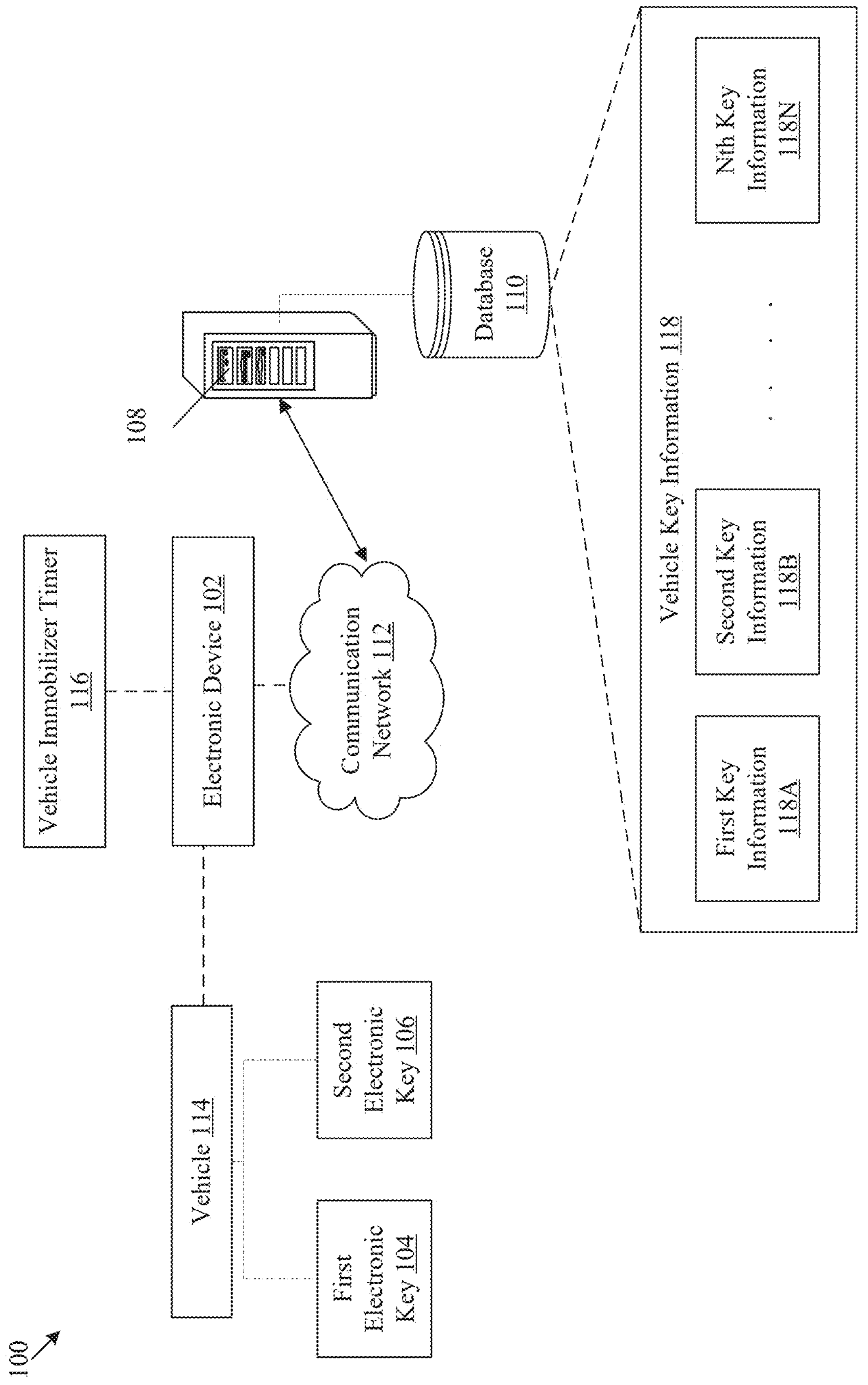
FIG. 1 is a block diagram that illustrates an exemplary network environment for vehicle immobilizer timer based on electronic key learning to facilitate anti-theft security of a vehicle, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed electronic device and a server including a circuitry provided for facilitating operation of a vehicle immobilizer timer based on electronic key learning. Exemplary aspects of the disclosure provide an electronic device. The electronic device may receive first information associated with a vehicle. The first information may be indicative of a learning of an electronic key associated with the vehicle. The electronic device may control a selection of a delay time associated with an operation mode of the vehicle, based on the received first information. The electronic device may control the operation mode of the vehicle to be set in an immobilized state, based on the delay time and the received first information. The electronic device may detect whether a request, of a user associated with the vehicle, to mobilize the vehicle is received based on the operation mode of the vehicle being set as the immobilized state. The electronic device may authenticate the user, based on the detection that the request is received. The electronic device may control the operation mode of the vehicle to be set in a mobilized state, based on at least one of expiry of the delay time or the authentication of the user.

In recent times, vehicle theft has evolved as thieves exploit service tools to add a valid new electronic key to a vehicle, enabling the thieves to steal the vehicle within minutes. Thus, there is a considerable challenge to vehicle security. The disclosed implementations provide an innovative solution to the based on use of an immobilizer timer (i.e., a timer associated with the delay time) that activates when a new vehicle's keys are registered. The vehicle may then be immobilized until the timer expires, with the duration of the timer potentially varying based on factors such as the market, vehicle, trim, or type of keys added.

The immobilizer timer can be remotely cancelled by a manufacturer with a proof of ownership, or through secure access with the owner's cell phone and data connection, or through a secure PIN code, fingerprint, or facial recognition set up by the owner. While the use of the immobilizer timer may cause a minor inconvenience to the owner, it could deter thieves by forcing them to wait with the vehicle for the duration of the timer before the vehicle can be driven away, potentially raising suspicion and leading to their arrest.

The disclosed solution offer several advantages over the existing methods of vehicle security. The disclosed method introduces a delay timer that activates when a new vehicle's keys are registered, thereby effectively immobilizing the vehicle until the timer expires. The delay timer may be particularly effective against the recent trend of thieves using service tools to add a valid new keys to the vehicle. Further, as the duration of the immobilization timer can be varied based on factors such as the market, vehicle, trim, or type of keys added, the disclosed delay timer provides flexibility with a more tailored approach to vehicle security. Further, the delay timer may be remotely cancelled by the manufacturer with proof of ownership, or through secure access with the owner's cell phone and data connection, through a secure PIN code, fingerprint, or facial recognition set up by the owner. The multi-layered approach to cancellation not just adds an extra layer of security but also provides convenience to the owner. In addition, while the system may cause a minor inconvenience to the owner, it could deter thieves by forcing them to wait with the vehicle for the duration of the timer before they can drive away. The delay could potentially raise suspicion and lead to their arrest, thereby enhancing the overall security of the vehicle.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 is a block diagram that illustrates an exemplary network environment for vehicle immobilizer timer based on electronic key learning to facilitate anti-theft security of a vehicle, in accordance with an embodiment of the disclosure. With reference to FIG. 1, there is shown a network environment 100. The network environment 100 may include an electronic device 102, a server 108, a database 110, a communication network 112, a vehicle 114, and a vehicle immobilizer timer 120. The electronic device 102, the server 108, the database 110, and the vehicle 114 may be communicatively coupled to one another via the communication network 112. In some embodiments, the database 110 may be connected to the communication network 112. Alternatively, or additionally, the database 110 may be accessible through the server 108. Further, the database 110 may include vehicle key information 118 that may include first key information 118A, second key information 118B, . . . and Nth key information 118N. In FIG. 1, there is further shown a first electronic key 104 and a second electronic key 106. The first electronic key 104 and the second electronic key 106 may be electronic keys registered for operation of the vehicle 114. The N number of key information in the vehicle key information 118 is only for exemplary purpose. The scope of the disclosure is not limited to N such key information. The vehicle key information 118 may include only two or more than N key information, without departure from the scope of the disclosure.

The electronic device 102 may include suitable logic, control circuitry, interfaces, and/or code that may be configured to receive first information indicative of a learning of the second electronic key 106 for the vehicle 114. Herein, the first electronic key 104 may be pre-configured for the vehicle 114 and the second electronic key 106 may be learned or registered for the vehicle 114, in case, for example, due to loss of the first electronic key 104. Further, the electronic device 102 may control the selection of a delay time associated with an operation mode of the vehicle 114, based on the received first information. The electronic device 102 may control the operation mode of the vehicle 114 to be set in the immobilized state, based on the delay time and the received first information. Further, the electronic device 102 may detect whether a request is received, from a user of the vehicle 114, to mobilize the vehicle 114 based on the operation mode of the vehicle 114 being set as the immobilized state. The electronic device 102 may authenticate the user, based on the detection that the request is received. Further, the electronic device 102 may control the operation mode of the vehicle 114 to be set in the mobilized state, based on the at least one of the expiry of the delay time or the authentication of the user. Examples of the electronic device 102 may include, but are not limited to, a computing device, a smartphone, a cellular phone, a mobile phone, a computer work-station, a consumer electronic (CE) device, a vehicle remote controller device, a user wearable device, and/or any computing device that may be capable to remotely control the vehicle 114. In an embodiment, the electronic device 102 may be associated with at least one of a manufacturer, a retailer, a dealer, a vendor, a service provider, an infrastructure provider, or a user associated with the vehicle 114.

The first electronic key 104 may be an electronic key which may be generated based on an initial key learning/registration of the vehicle 114. The first electronic key 104 may include key information (such as, the first key information 118A) and may be stored on inbuilt memory of an Electronic Control Unit (ECU) of the vehicle 114 (and/or on the database 110). The key information may be, for example, identification information for identifying the first electronic key 104. For example, the first key information 118A may include identification information for the first electronic key 104 (or an existing electronic key) along with details/identification information of the vehicle 114. Further, a vehicle key, which is newly registered (for example, by the manufacturer, OEM, or the user), may be referred to as the second electronic key 106. The second key information 118B may include identification information of the second electronic key 106 along with details/identification of the vehicle 114. In an example, a registration of an electronic key (such as, the first (existing) electronic key 104 or the second electronic key 106) with the vehicle 114 may be performed in a dealer's shop, for example, when the vehicle 114 is delivered to the vehicle owner or when the first electronic key 104 is lost. The registration of an electronic key is also referred herein as a learning of the electronic key. Once the registration of an electronic key with the vehicle 114 is performed, the electronic key may be used to operate the vehicle 114.

The server 108 may include suitable logic, control circuitry, and interfaces, and/or code that may be configured to receive or determine the first information associated with the vehicle 114. The first information is indicative of the learning of the first electronic key 104 associated with the vehicle 114. The vehicle 114 may be further associated with the server 108. The server 108 may further select a delay time associated with the operation mode of the vehicle 114, based on the determined first information. The server 108 may further control the operation mode of the vehicle 114 to be set in the immobilized state, based on the selected delay time and the determined first information. The server 108 may further detect whether the request, of the user associated with the vehicle 114, to mobilize the vehicle 114 is received based on the operation mode of the vehicle being set as the immobilized state. The server 108 may further authenticate the user, based on the detection of the received request associated with the vehicle 114. The server 108 may further control the operation mode of the vehicle 114 to be set in the mobilized state, based on the at least one of the expiry of the selected delay time or the authentication of the user. The selection of the delay time may be based on the at least one of the type of market associated with the vehicle 114, the type of trim associated with the vehicle 114, the model associated with the vehicle 114, or the type associated with the first electronic key 104.

The server 108 may be implemented as a cloud server and may execute operations through web applications, cloud applications, HTTP requests, repository operations, file transfer, and the like. Other example implementations of the server 108 may include, but are not limited to, a database server, a file server, a web server, a media server, an application server, a mainframe server, or a cloud computing server.

In at least one embodiment, the server 108 may be implemented as a plurality of distributed cloud-based resources by use of several technologies that are well known to those ordinarily skilled in the art. A person with ordinary skill in the art will understand that the scope of the disclosure may not be limited to the implementation of the server 108 and the electronic device 102 as separate entities. In certain embodiments, the functionalities of the server 108 can be incorporated in its entirety or at least partially the electronic device 102, without a departure from the scope of the disclosure.

The database 110 may include suitable logic, interfaces, and/or code that may be configured to store the vehicle key information 118, instructions to control the selection of the delay time, instructions to control the operation mode of the vehicle 114 to be set in the immobilized state, and instructions to control the operation mode of the vehicle 114 to be set in the mobilized state. The database 110 may be derived from data off a relational or non-relational database, or a set of comma-separated values (csv) files in conventional or big-data storage. The database 110 may be stored or cached on a device, such as a server (e.g., the server 108) or the electronic device 102. The device storing the database 110 may be configured to receive a query for vehicle information data, data associated with the first electronic key 104, data associated with the second electronic key 106, and/or the data associated with the electronic device 102 from the server 108 and/or the electronic device 102. In response, the device of the database 110 may be configured to retrieve and provide the queried vehicle information data or vehicle identification data, the data associated with the first electronic key 104, the data associated with the second electronic key 106, or and/or the data associated with the electronic device 102 to the server 108 and/or the electronic device 102 based on the received query.

In some embodiments, the database 110 may be hosted on a plurality of servers stored at same or different locations. The operations of the database 110 may be executed using hardware including a processor, a microprocessor (e.g., to perform or control performance of one or more operations), a field-programmable gate array (FPGA), or an application-specific integrated circuit (ASIC). In some other instances, the database 110 may be implemented using software.

The communication network 112 may include a communication medium through which the electronic device 102, the server 108 (and in some cases the database 110), the vehicle 114, and the vehicle immobilizer timer 120 may communicate with each other. The electronic device 102, the server 108, the database 110, the vehicle 114, and the vehicle immobilizer timer 120 may be communicatively coupled to one another via the communication network 112. The communication network 112 may be one of a wired connection or a wireless connection. Examples of the communication network 112 may include, but are not limited to, the Internet, a cloud network, Cellular or Wireless Mobile Network (such as Long-Term Evolution and 5G New Radio), satellite network (e.g., a network of a set of low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 112 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The vehicle 114 may include suitable logic, control circuitry, interfaces, and/or code that may be configured to immobilize the vehicle upon learning of the second electronic key 106 of the vehicle 114. The vehicle 114 may include an electronic control unit (ECU). The ECU of the vehicle 114 may receive the first information associated with the vehicle 114. The first information may be indicative of the learning of the second electronic key 106 associated with the vehicle 114. In some embodiments, the vehicle 114 may include the first electronic key 104 and may also include the electronic device 102 associated with the vehicle 114. The ECU may control the selection of the delay time associated with the operation mode of the vehicle 114, based on the received first information. Further, the ECU may control the operation mode of the vehicle 114 to be set in the immobilized state based on the controlled delay time and the received first information. The ECU may detect whether the request, of the user associated with the vehicle 114, to mobilize the vehicle 114 is received based on the operation mode of the vehicle 114 being set as the immobilized state. For example, the request may be received through a door lock of the vehicle 114, through a web application or a mobile application (via the electronic device 102). Further, the ECU may authenticate the user, based on the detection of the received request. The ECU may control the operation mode of the vehicle 114 to be set in the mobilized state, based on the at least one of the expiry of the delay time or the authentication of the user.

The vehicle 114 may be a non-autonomous vehicle, a semi-autonomous vehicle, or a fully autonomous vehicle. Examples of the vehicle 114 may include, but are not limited to, a two-wheeler vehicle, a three-wheeler vehicle, a four-wheeler vehicle, a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. The vehicle 114 may be a system through which a rider may travel from a start point to a destination point. Examples of the two-wheeler vehicle may include, but are not limited to, an electric two-wheeler, an internal combustion engine (ICE)-based two-wheeler, or a hybrid two-wheeler. Similarly, examples of the four-wheeler vehicle may include, but are not limited to, an electric car, an internal combustion engine (ICE)-based car, a fuel-cell based car, a solar powered-car, or a hybrid car. The present disclosure may be also applicable to other types of two-wheelers (e.g., a scooter) or four-wheelers. The description of other types of the vehicle 114 has been omitted from the disclosure for the sake of brevity. The vehicle 114 may be registered to a corresponding owner based on the vehicle information or vehicle identification information associated with the corresponding vehicle.

The vehicle immobilizer timer 116 may include logic, code, control circuitry, and/or interfaces that may be configured to implement a count-down timer configured to track a passage of the delay time associated with the immobilization of the vehicle 114, once the count-down timer is activated. In an embodiment, based on the learning or registration of the second electronic key 106, the electronic device 102 and/or the vehicle 114 may control the vehicle immobilizer timer 116 to set the delay timer and start a count-down of the delay time. Until the count-down of the delay timer does not end, the vehicle 114 may be immobilized. The vehicle 114 may be mobilized only based on cancellation or expiry of the count-down of the delay time. Conditions for the cancellation of the count-down of the delay time may include, for example, user authentication, proof of ownership, secure access or data connection, remote cancellation by a dealer or manufacturer of the vehicle 114, or any emergency situation detected based on on-board sensors of the vehicle 114. The use of the delay timer may serve as a deterrent against theft, particularly in scenarios where thieves attempt to quickly add a new set of keys using sophisticated tools and drive away with the vehicle.

In operation, the electronic device 102 may receive first information indicative of learning of an electronic key associated with the vehicle 114. The first information may be received from the server 108, the database 110, or a computing device of the manufacturer or dealer. The first information may be received when a new electronic key is learned. For example, the electronic device 102 may receive the second key information 118B indicative of the identification information of the new electronic key (i.e., the second electronic key 106) and the identification information of the vehicle 114. The second key information 118B may indicate that the second electronic key 106 has been configured to the vehicle 114 and can be used for operation of the vehicle 114. Details related to the reception of the first information are further provided, for example, in FIG. 4 (at 402).

The electronic device 102 may control a selection of a delay time associated with an operation mode of the vehicle 114, based on the received first information. The control of the selection of the delay time may be based on at least one of a location of the vehicle, a type of market associated with the vehicle 114, a type of trim associated with the vehicle 114, a model associated with the vehicle 114, or a type associated with the first electronic key 104. Details related to the control of the selection of the delay time associated with the operation mode of the vehicle are further provided, for example, in FIG. 4 (at 404).

The electronic device 102 may control the operation mode of the vehicle 114 to be set in an immobilized state, based on the delay time and the received first information. For example, on receipt of an indication (i.e., the first information) that a new electronic key (e.g., the second electronic key 106) has been learned or registered and the delay time has been set, the electronic device 102 may set the operation mode of the vehicle 114 in the immobilized state. In the immobilized state, the vehicle 114 may be inoperable until expiry of the delay time or authentication of a user of the vehicle 114. Details related to the control of the operation mode of the vehicle to be set in the immobilized state are further provided, for example, in FIG. 4 (at 406).

The electronic device 102 may detect whether a request of a user associated with the vehicle 114 to mobilize the vehicle 114 is received, based on the operation mode of the vehicle 114 being set as the immobilized state. Thus, during an immobilization period (i.e., when the delay timer is in progress and the vehicle 114 is immobilized), the electronic device 102 may receive a request to mobilize the vehicle 114. The electronic device 102 may detect such request and authenticate the user (as described later). Details related to the detection of the user request associated with the vehicle to mobilize the vehicle are further provided, for example, in FIG. 4 (at 408).

The electronic device 102 may authenticate the user, based on the detection that the request of the user associated with the vehicle 114 is received. Herein, the authentication of the user may be based on the determination that the user corresponds to the owner of the vehicle 114. The authentication may be based on second information, which may be a proof of ownership provided by the user. Additionally, the authentication of the user may be also be based on third information, which may be indicative of a secure access or a data connection to the vehicle 114, established through the electronic device 102. Furthermore, the authentication of the user may also be based on fourth information 122D, which may include a secure authentication credential of the user, such as a secure Personal Identification Number (PIN), a fingerprint, a facial scan, or an authentication code. Details related to the authentication of the user are further provided, for example, in FIG. 4 (at 410).

The electronic device 102 may control the operation mode of the vehicle 114 to be set in the mobilized state, based on the at least one of the expiry of the delay time or the authentication of the user. Herein, cancelation of the delay time may be controlled based on the authentication of the user or the expiry of the delay time. Details related to the control of the operation mode of the vehicle to be set in the mobilized state are further provided, for example, in FIG. 4 (at 412).

Figure 2:
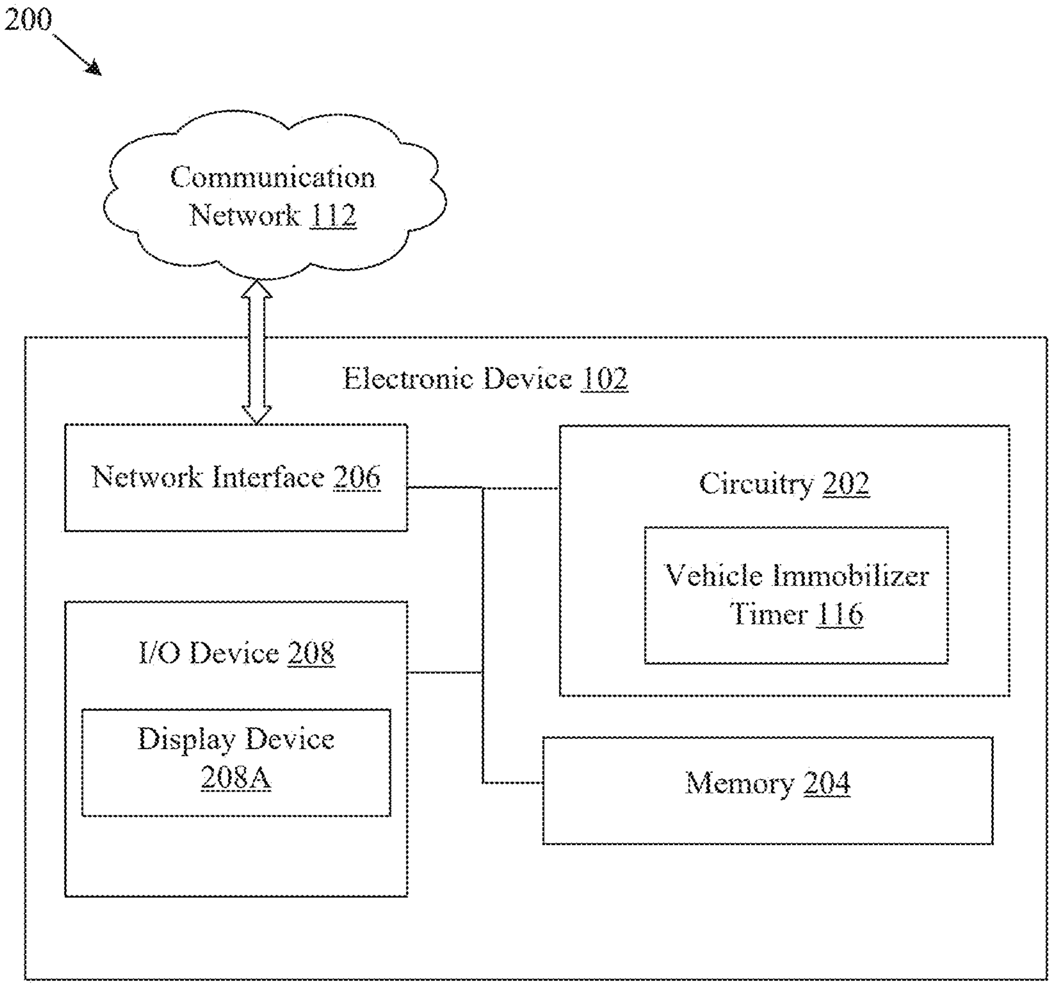
FIG. 2 is a block diagram that illustrates an exemplary electronic device of FIG. 1, in accordance with an embodiment of the disclosure.

FIG. 2 is a block diagram that illustrates an exemplary electronic device of FIG. 1, in accordance with an embodiment of the disclosure. FIG. 2 is explained in conjunction with elements from FIG. 1. With reference to FIG. 2, there is shown a block diagram 200 of the electronic device 102. The electronic device 102 may include a circuitry 202, a memory 204, a network interface 206, and an input/output (I/O) device 208. The input/output (I/O) device 208 may include a display device 208A. Although in FIG. 2, it is shown that the electronic device 102 includes the circuitry 202, the memory 204, the network interface 206, and the input/output (I/O) device 208; however, the disclosure may not be so limiting, and the electronic device 102 may include less or more components to perform the same or other functions of the electronic device 102. Details of the other functions or components have been omitted from the disclosure for the sake of brevity.

The circuitry 202 may include suitable logic, control circuitry, and interfaces that may be configured to execute one or more program instructions associated with different operations to be executed by the electronic device 102. For example, some of the operations may include, receipt of the first information, the control of the selection of the delay time, the control of the vehicle operation mode to the immobilized state, the user request detection, the user authentication, and the control of the vehicle operation mode the mobilized state. The circuitry 202 may be configured to control the vehicle immobilizer timer 116. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, control circuitry, and interfaces that may be configured to store the one or more program instructions to be executed by the circuitry 202. The memory 204 may be configured to store vehicle information data or vehicle identification data and the vehicle key information 118. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may include suitable logic, control circuitry, and interfaces that may be configured to facilitate communication between the electronic device 102, the server 108, the database 110, and the vehicle 114, via the communication network 112. The network interface 206 may be implemented by use of various known technologies to support wired or wireless communication of the electronic device 102 with the communication network 112. The network interface 206 may include, but may be not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer control circuitry. The network interface 206 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation New Radio (5G NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The I/O device 208 may include suitable logic, control circuitry, and interfaces that may be configured to receive an input from the user and provide an output based on the received input. For example, the I/O device 208 may receive a user input indicative of a selected delay time. The I/O device 208 may also receive a user input indicative of authentication data for the authentication of the user. The I/O device 208 may render vehicle key information 118, data related to the vehicle 114, the selected delay time and the current operation mode of the vehicle 114. The I/O device 208 may also display an indication whether the authentication of the user is successful or not. The I/O device 208, which may include various input and output devices, may be configured to communicate with the electronic device 102 or the server 108. Examples of the I/O device 208 may include, but are not limited to, a touch screen, a keyboard, a mouse, a joystick, a microphone, a display device (e.g., the display device 208A), a haptic device, and a speaker.

The display device 208A may include suitable logic, control circuitry, and interfaces that may be configured to display the received first information indicative of the learning of the first electronic key 104, the delay time (if selected), the current operation mode of the vehicle 114, the detected request of the user to mobilize the vehicle 114, and a result of the authentication of the user. The display device 208A may be a touch screen which may enable the user to provide a user-input, via the display device 208A. The touch screen may be at least one of a resistive touch screen, a capacitive touch screen, or a thermal touch screen. The display device 208A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 208A may refer to a display screen of a head mounted device (HMD), a smart-glass device, a see-through display, a projection-based display, an electro-chromic display, or a transparent display.

The functions or operations executed by the electronic device 102, as described in FIG. 1, may be performed by the circuitry 202. Operations executed by the circuitry 202 are described in detail, for example, in FIG. 4.

Figure 3:
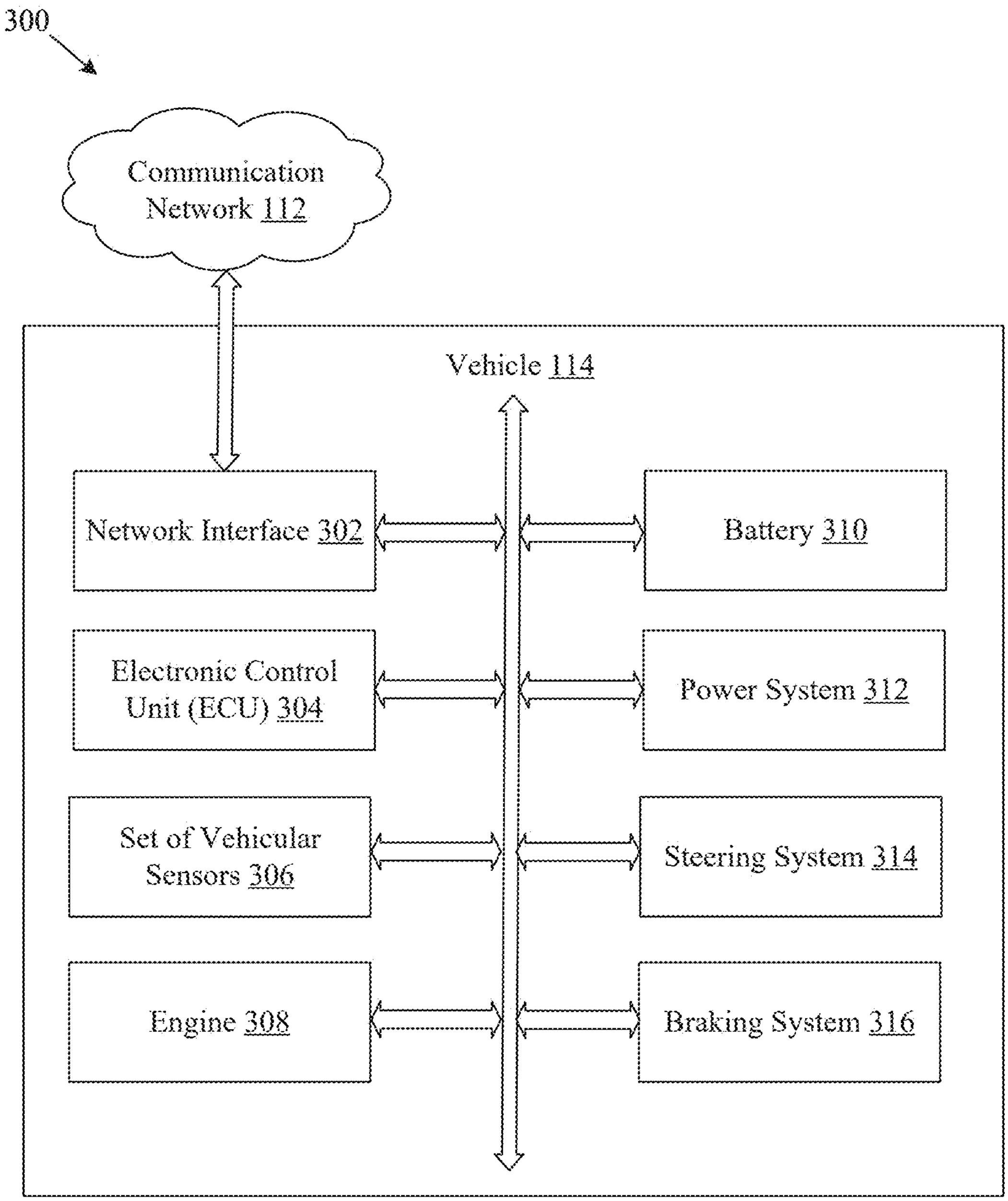
FIG. 3 is a block diagram that illustrates an exemplary vehicle of FIG. 1, in accordance with an embodiment of the disclosure.

FIG. 3 is a block diagram that illustrates an exemplary vehicle of FIG. 1, in accordance with an embodiment of the disclosure. FIG. 3 is explained in conjunction with elements from FIG. 1, and FIG. 2. With reference to FIG. 3, there is shown a block diagram 300 of the vehicle 114. The vehicle 114 may include a network interface 302, an electronic control unit (ECU) 304, a set of vehicular sensors 306, an engine 308, a battery 310, a power system 312, a steering system 314, and a braking system 316. Although in FIG. 3, it is shown that the vehicle 114 includes the network interface 302, the electronic control unit 304, the set of vehicular sensors 306, the engine 308, the battery 310, the power system 312, the steering system 314, and the braking system 316; however, the disclosure may not be so limiting, and the vehicle 114 may include less or more components to perform the same or other functions of the vehicle 114. Details of the other functions or components have been omitted from the disclosure for the sake of brevity.

The network interface 302 may include suitable logic, control circuitry, and interfaces that may be configured to facilitate communication between the vehicle 114, the electronic device 102, and the server 108 via the communication network 112. The network interface 302 may be implemented by use of various known technologies to support wired or wireless communication of the vehicle 114 with the communication network 112. The network interface 302 may include, but may be not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer control circuitry. The network interface 302 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation New Radio (5G NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The electronic control unit (ECU) 304 may include suitable logic, control circuitry, interfaces, and/or code that may be configured to activate or deactivate the set of vehicular sensors 306. The electronic control unit 304 may be a specialized electronic control circuitry that may include an ECU processor to control different functions, such as, but not limited to, engine operations, communication operations, and data acquisition of the vehicle 114. In an embodiment, the electronic control unit 304 may be a microprocessor. Other examples of the electronic control unit 304 may include, but are not limited to, a vehicle control system, an in-vehicle infotainment (IVI) system, an in-car entertainment (ICE) system, an automotive Head-up Display (HUD), an automotive dashboard, an embedded device, a smartphone, a human-machine interface (HMI), a computer workstation, a handheld computer, a cellular/mobile phone, a portable consumer electronic (CE) device, a server, and other computing devices. The electronic control unit 304 may be included or integrated in the vehicle 114.

In an embodiment, the electronic control unit 304 may be a control circuitry that may be configured to receive the first information indicative of the learning of the second electronic key 106 associated with the vehicle 114. The second electronic key 106 may be a newly registered vehicle key associated with the vehicle 114. The control circuitry may control the selection of the delay time associated with the operation mode of the vehicle 114, based on the received first information. The control circuitry may control the operation mode of the vehicle 114 to be set in the immobilized state, based on the delay time and the received first information. The control circuitry may detect whether the request of the user associated with the vehicle 114 to mobilize the vehicle 114 is received, based on the operation mode of the vehicle 114 being set as the immobilized state. The control circuitry may authenticate the user, based on the detection of the request associated with the vehicle 114 being received. The control circuitry may control the operation mode of the vehicle 114 to be set in the mobilized state, based on the at least one of the expiry of the delay time or the authentication of the user. The delay time may be canceled based on the authentication of the user.

The set of vehicular sensors 306 may include a speedometer, an accelerometer, a location sensor, a tachometer, a weather sensor, an imaging sensor, a pressure sensor, a temperature sensor, a level sensor, a shock absorber, and the like. The speedometer may measure an instantaneous or an average speed of the vehicle 114. The accelerometer may measure an instantaneous or an average acceleration of the vehicle 114. The location sensor may determine a location of the vehicle 114. The tachometer may determine a speed in rotations per minute of the engine 308 of the vehicle 114. The weather sensor may determine a weather of the location of the vehicle 114. The imaging sensor may capture images of a region around the vehicle 114. The pressure sensor may determine a pressure of fluids (for example, engine oil, transmission oil, and hydraulic oil) of the vehicle 114. The level sensor may determine a level of fluids of the vehicle 114. The temperature sensor may determine a temperature of a region around the vehicle 114. The temperature sensor may also determine an internal temperature of the engine 308.

The engine 308 may be configured to provide power to the vehicle 114. The engine 308 may be an internal combustion engine with may include operations, for example, fuel injection, compression, ignition, or emission to power and drive the vehicle 114. The engine 308 may include various parts, for example, but are not limited to, a crankshaft, a cylinder, a spark plug, a piston, camshaft, a valve, combustion chamber, etc. In some embodiments, the engine 308 may include a motor in case of an electric motorcycle. The engine 308 may be two-stroke or four-stroke internal combustion engines. The engine 308 may include either one, two, three, four, or six cylinders. Examples of the engine 308 may include, but are not limited to, an inline engine (i.e. single cylinder, parallel twin, inline-triple, inline-four, inline-six), a V layout engine (i.e. V-twin engine, a V4 engine, a V8 engine), a flat (boxer) engine (i.e. flat-two, flat-four, flat-six), a lawn mower engine, a snow blower engine, or other motorcycle engines known in the art. A description of various parts of the engine 308 has been omitted from the disclosure for the sake of brevity.

The battery 310 may be a source of electric power for one or more electric circuits or loads (not shown). For example, the battery 310 may be a source of electrical power to a control circuitry (not shown) of the vehicle 114, network interface 302, the electronic control unit 304, the engine 308, the power system 312, the steering system 314, and the braking system 316. The battery 310 may be a rechargeable battery. The battery 310 may be the source of electrical power to start the engine 308 of the vehicle 114. In some embodiments, the battery 310 may correspond to a battery pack, which may have a plurality of clusters of batteries, which may be surrounded by a suitable coolant and a charge controller (not shown in FIG. 3). Examples of the battery 310 may include, but are not limited to, a lead acid battery, a nickel cadmium battery, a nickel-metal hydride battery, a lithium-ion battery, and other rechargeable batteries.

The power system 312 may include suitable logic, control circuitry, interfaces, and/or code that may be configured to control electric power which may be output to various electric circuits and loads of the vehicle 114. The power system 312 may include a battery (not shown) to provide the electric power to perform various electrical operations of the vehicle 114. The power system 312 may provide the electric power for functioning of different components (such as, the electronic control unit 304, a communication system, the steering system 314, and the set of vehicular sensors 306) of the vehicle 114. The power system 312 may be configured to receive control signals from a processor to control the electronic control unit 304, the communication system, the steering system 314, and the set of vehicular sensors 306 of the vehicle 114. The power system 312 may be configured to control the charging and the discharging of the battery 310 and an auxiliary battery based on the received control signals. The power system 312 may be configured to control the transfer of the electric energy between the power system 312 and the communication system, the set of vehicular sensors 306, the steering system 314, and the set of vehicular sensors 306 of the vehicle 114. Examples of the power system 312 may include, but are not limited to, an electric charge/discharge controller, a charge regulator, a battery regulator, a battery management system, an electric circuit breaker, a power electronic drive control system, an Application-Specific Integrated Circuit (ASIC) processor, and/or other energy-control hardware processors.

The steering system 314 may receive one or more control commands from the user. The steering system 314 may include a steering wheel/handlebar and/or an electric motor (provided for a power-assisted steering) that may be used by a driver to control movement of the vehicle 114 in manual mode or a semi-autonomous mode. In accordance with an embodiment, the movement or steering of the vehicle 114 may be automatically controlled when the vehicle 114 is in autonomous mode. Examples of the steering system 314 may include, but are not limited to, an autonomous steering control, a power-assisted steering system, a vacuum/hydraulic-based steering system, an electro-hydraulic power-assisted system (EHPAS), or a "steer-by-wire" system, or an autonomous steering system, known in the art.

The braking system 316 may be used to stop or slow down the vehicle 114 by application of resistive forces, such as electromagnetic and/or frictional forces. The braking system 316 may receive a command from a powertrain control system under the control of a control circuitry when the vehicle 114 is in an autonomous mode or a semi-autonomous mode. In accordance with an embodiment, the braking system 316 may receive a command from the control circuitry when the control circuitry preemptively detects intent of the user to perform a specific task which requires the user to apply brakes.

Figure 4:
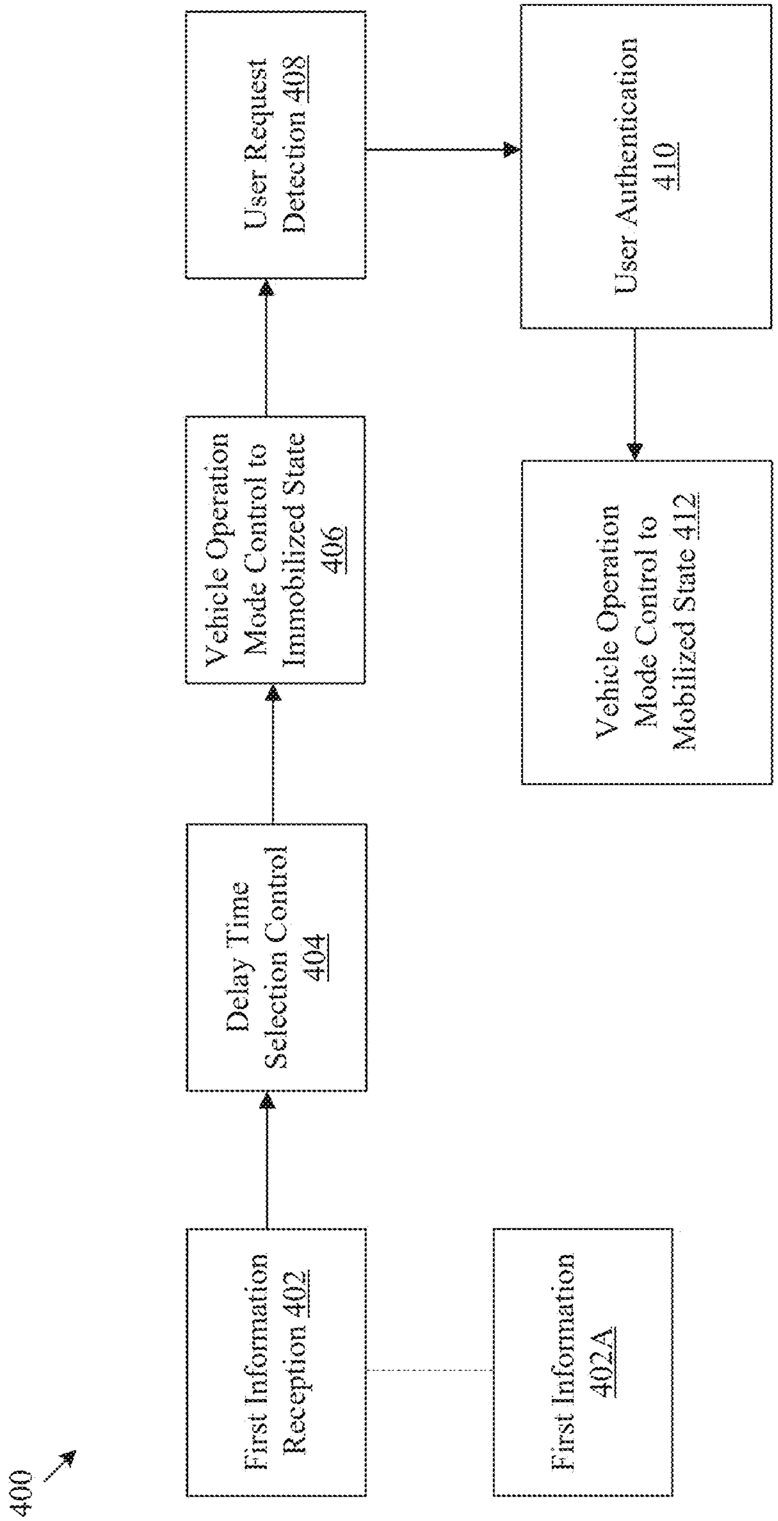
FIG. 4 is a diagram that illustrates an execution pipeline for operation of vehicle immobilizer timer based on electronic key learning, in accordance with an embodiment of the disclosure.

FIG. 4 is a block diagram that illustrates an execution pipeline for operation of vehicle immobilizer timer based on electronic key learning, in accordance with a first embodiment of the disclosure. FIG. 4 is explained in conjunction with elements from FIG. 1, FIG. 2, and FIG. 3. With reference to FIG. 4, there is shown an execution pipeline 400 for operation of the vehicle immobilizer timer 116 based on an electronic key learning (i.e., a registration of a new electronic key, such as, the second electronic key 106). The execution pipeline 400 may include exemplary operations from 402 to 412 that may be executed by the circuitry 202 of the electronic device 102.

At 402, an operation of receiving of first information (e.g., first information 402A) may be executed. In an embodiment, the circuitry 202 may be configured to receive the first information 402A associated with the vehicle 114. The first information may be indicative of the learning of a new electronic key (e.g., the second electronic key 106) associated with the vehicle 114. It may be appreciated that the first information 402A or data related electronic keys (for example, the first electronic key 104 or the second electronic key 106) may be stored in the database 110 as the vehicle key information 118 (for example, the first key information 118A and the second key information 118B). For example, the circuitry 202 may be configured to receive the first information 402A (e.g., the second key information 118B) associated with the vehicle 114 from the database 110 (via, for example, the server 108), to immobilize the vehicle 114.

At 404, an operation of delay time selection control may be executed. In an embodiment, the circuitry 202 may be configured to control the selection of the delay time associated with the operation mode of the vehicle 114, based on the received first information 402A. The circuitry 202 may be configured to receive a location associated with the vehicle 114. For example, the location may be received from the set of vehicular sensors 306 and/or from the network interface 206. The control of the selection of the delay time may be based on a location of the vehicle 114. For example, the delay time may be set as 2 hours for a location with lower theft rate and may be set as 5 hours for a location with a higher crime rate. It may be appreciated that the control of the selection of the delay time may also be based on at least one of the type of market associated with the vehicle 114, the type of trim associated with the vehicle 114, the model associated with the vehicle 114, or the type associated with the second electronic key 106. For example, the delay time may be set a higher value in case of a costly vehicle. In addition, in case an electronic key of the vehicle 114 is easy to replicate or program (which may increase a vulnerability of the electronic key), the delay time may be set as a higher value.

At 406, an operation for control of a vehicle operation mode to an immobilized state may be executed. In an embodiment, the circuitry 202 may be configured to control the operation mode of the vehicle 114 to be set in the immobilized state based on the delay time and the received first information 402A. For example, in case, the delay time is set as 1 hour, the circuitry 202 may be control the operation mode of the vehicle 114 to be set as the immobilized state. Based on the operation mode of the vehicle 114 set as the immobilized state for 1 hour, the vehicle 114 may remain inoperable for the next 1 hour, unless a user request for cancellation is received from an authenticated user.

At 408, an operation of user request detection may be executed. In an embodiment, the circuitry 202 may be configured to detect whether the request of the user associated with the vehicle 114 to mobilize the vehicle 114 is received, based on the operation mode of the vehicle 114 being set as the immobilized state. It may be appreciated that the request of the user to set the operation mode of the vehicle 114 to the mobilized mode may be initiated based on a use of the first electronic key 104 (or the second electronic key 106) to unlock the vehicle 114. Alternatively, the user request to unlock and/or mobilize the vehicle 114 may be received from the electronic device 102 or any computing device of the user, vehicle dealer, or vehicle manufacturer. The user request may be received when the delay time is still running. For example, the vehicle 114 may be immobilized for a duration of 1 hour (i.e., the delay time is 1 hour) upon registration of the second electronic key 106. In such case, if the user returns to the vehicle 114 within the duration of 1 hour and provides a correct electronic key (e.g., the first electronic key 104 or the second electronic key 106) of the vehicle 114, the user may be authenticated. The vehicle 114 may be mobilized in case of a successful authentication of the user.

At 410, an operation of user authentication may be executed. In an embodiment, the circuitry 202 may be configured to authenticate the user, based on the detection of the request associated with the vehicle 114 to mobilize the vehicle 114 being received. Herein, the authentication of the user may be further based on the determination that the user corresponds to the owner of the vehicle 114. Further, the authentication of the user may be based on second information indicative of the proof of ownership of the vehicle 114 by the user. Further, the authentication of the user may be based on third information indicative of the at least one of the secure access or the data connection to the vehicle 114. Further, the authentication of the user may be based on fourth information indicative of the secure authentication credential of the user. The secure authentication credential of the user may correspond to the at least one of the secure PIN of the user, the fingerprint of the user, the facial scan of the user, or the authentication code of the user.

At 412, an operation of control of a vehicle operation mode to a mobilized state may be executed. In an embodiment, the circuitry 202 may be configured to control the operation mode of the vehicle 114 to be set in the mobilized state, based on the at least one of the expiry of the delay time or the authentication of the user. In case a request for cancellation of the delay time is received before an end of the delay time, the circuitry 202 may perform an authentication of the user (as described, for example, at 410). Based on a successful authentication of the user, the operation mode of the vehicle 114 may be set to the mobilized state. The vehicle 114, which is now set in the mobilized state, may become operational (and may also unlock for use).

It may be noted that the vehicle 114 may include the circuitry 202 (and/or the ECU 304), which may receive the first information 402A indicative of the learning of the second electronic key 106 associated with the vehicle 114. The vehicle 114 may include the electronic device 102. For example, the ECU 304 may receive a newly registered electronic key for operation of the vehicle 114. The delay time associated with the operation mode of the vehicle 114 may be selected. Based on the received first information 402A, the ECU 304 may control the selection of the delay time associated with the operation mode of the vehicle 114. The circuitry 202 (and/or the ECU 304) may control the selection of the delay time associated with the operation mode of the vehicle 114, based on the information indicative of the learned new electronic key (e.g., the second electronic key 106). The circuitry 202 (and/or the ECU 304) may control the operation mode of the vehicle 114 to be set in the immobilized state, based on the delay time and the received first information 402A. The circuitry 202 (and/or the ECU 304) may detect whether the request, of the user associated with the vehicle 114, to mobilize the vehicle 114 is received based on the operation mode of the vehicle 114 being set as the immobilized state. The circuitry 202 (and/or the ECU 304) may authenticate the user, based on the detection that the request of the user associated with the vehicle 114 is received. The circuitry 202 (and/or the ECU 304) may control the operation mode of the vehicle 114 to be set in the mobilized state, based on the at least one of the expiry of the delay time or the authentication of the user. The circuitry 202 (and/or the ECU 304) may be configured to determine whether the user corresponds to the owner of the vehicle 114. The authentication of the user is further based on the determination that the user corresponds to the owner of the vehicle 114. Further, the authentication of the user may be based on the second information indicative of the proof of ownership of the vehicle 114 by the user. The authentication of the user may be based on the third information indicative of the at least one of the secure access or the data connection to the vehicle 114. Further, the authentication of the user may be based on the fourth information indicative of the secure authentication credential of the user. The secure authentication credential of the user may correspond to the a least one of the secure PIN of the user, the fingerprint of the user, the facial scan of the user, or the authentication code of the user.

The proposed solution presents multiple benefits over current vehicle protection methods. It incorporates the vehicle immobilization timer 116 that may be triggered upon the registration of new keys for the vehicle 114, effectively rendering the vehicle 114 inoperative until the vehicle immobilization timer 116 runs its course. This delay timer may be particularly useful to counter the emerging trend of thieves employing service tools to program new, legitimate keys for vehicles. Additionally, a duration of the vehicle immobilization timer 116 may be adjustable, taking into account variables, such as the market of the vehicle 114, the model of the vehicle 114, the trim level of the vehicle 114, or the type of keys added for the vehicle 114. The adjustability of the duration of the vehicle immobilization timer 116 may offer a customizable security strategy. Moreover, the vehicle immobilization timer 116 may be deactivated remotely by the manufacturer upon verification of ownership, or by the owner using secure methods like a mobile phone with a data connection, or through personal security measures like a PIN, fingerprint, or facial recognition. Such multi-faceted cancellation strategy may not only enhance security but also add convenience for the owner. While the proposed solution might cause a slight delay for the owner, it may serve as a deterrent to thieves by making them wait, increasing the chance of detection and possible apprehension, thus bolstering an overall security posture of the vehicle 114.

Figure 5:
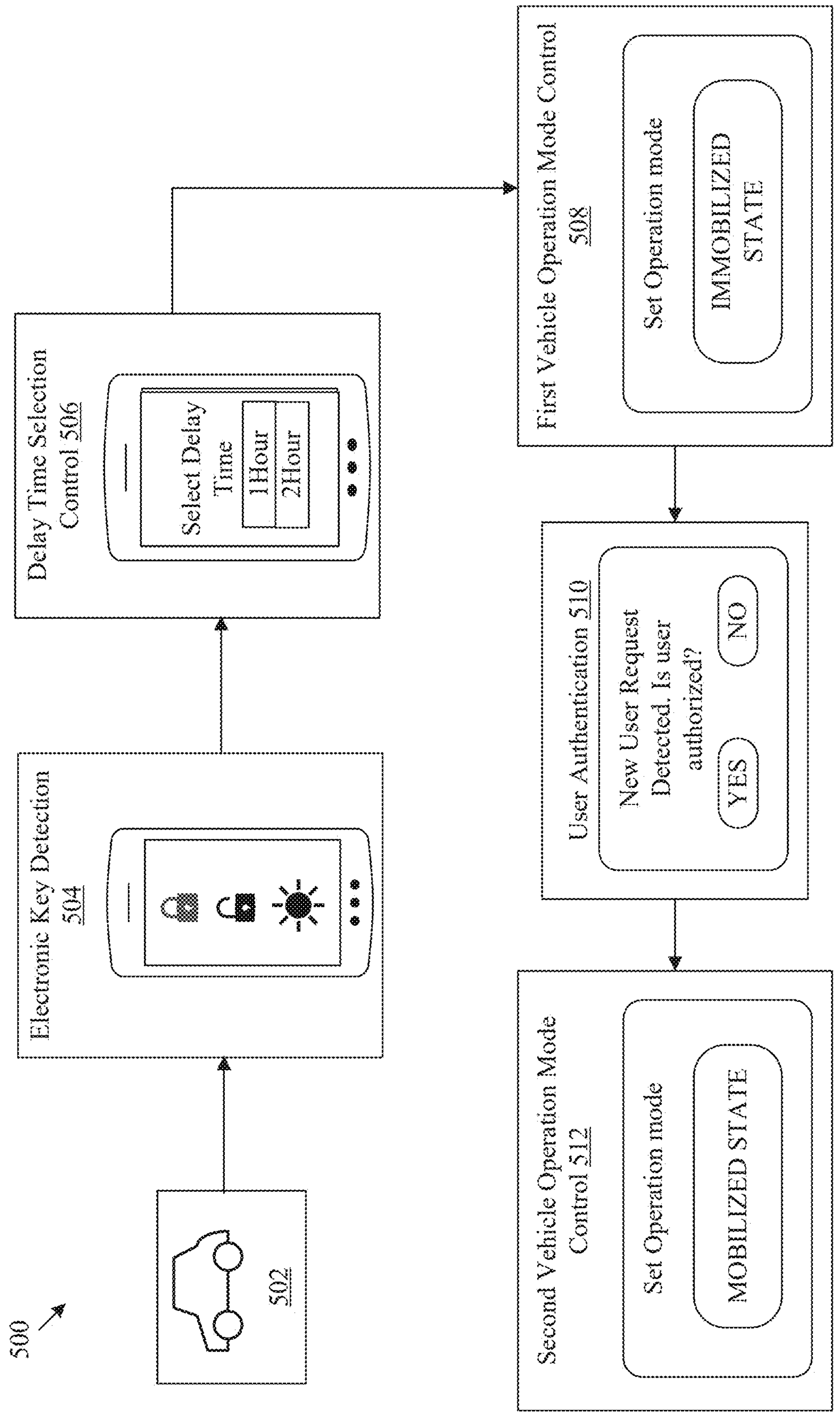
FIG. 5 is a block diagram that illustrates an exemplary scenario of operation of vehicle immobilizer timer based on electronic key learning to facilitate anti-theft security of a vehicle, in accordance with an embodiment of the disclosure.

FIG. 5 is a diagram that illustrates an exemplary scenario for operation of vehicle immobilizer timer based on electronic key learning to facilitate anti-theft security of a vehicle, in accordance with a second embodiment of the disclosure. FIG. 5 is explained in conjunction with elements from FIG. 1, FIG. 2, FIG. 3, and FIG. 4. With reference to FIG. 5, there is shown an exemplary scenario 500 for operation of the vehicle immobilizer timer 116 based on an electronic key learning (i.e., a registration of a new electronic key, such as, the second electronic key 106). The scenario 500 may include exemplary operations from 504 to 512 that may be executed by the circuitry 202 of the server 108. The scenario 500 may further include a vehicle 502, which may be similar to the vehicle 114. As the vehicle 502 may be similar to the vehicle 114, further details of the vehicle 502 are skipped herein for brevity.

At 504, an operation of electronic key detection may be executed. In an embodiment, the circuitry 202 may be configured to detect an electronic key (e.g., the second electronic key 106) associated with the vehicle 114. In an example, the detected electronic key may be a vehicle key which may be newly registered by the user, dealer, or manufacturer of the vehicle 114. Further, the detected electronic key may be the vehicle key associated with a vehicle number. The vehicle number may be an identification information for identifying the vehicle 114 and may be, for example, a number which is marked on a number plate which may be attached to the vehicle 114. Further, the detected second electronic key 106 may be the vehicle key which is generated by the server 108, for example, on the basis of the vehicle number.

The detection of the second electronic key 106 may correspond to the receipt of the first information by the circuitry 202. The received first information may be indicative of the learning of the second electronic key 106 associated with the vehicle 114. The vehicle 114 may be communicatively coupled to the server 108. When the new electronic key (e.g., the second electronic key 106) is learned or registered, the server 108 may generate the second key information 118B and store the second key information 118B in the vehicle key information 118 on the database 110. In an example, the second key information 118B may correspond to the second electronic key 106 and the first information may include the second key information 118B. The first information may be stored in the database 110 based on an indication from a computing device of a dealer or manufacturer of the vehicle 114 that a new electronic key of the vehicle 114 has been registered. Upon the registration of the second electronic key 106, the circuitry 202 may be configured to receive the first information associated with the vehicle 114 from the database 110.

At 506, an operation of delay time selection may be executed. In an embodiment, the circuitry 202 may be configured to select the delay time associated with the operation mode of the vehicle 114, based on the received first information (and/or the detection of the second electronic key 106). It may be appreciated that the selection of the delay time may be based on at least one of the type of market associated with the vehicle 114, the type of trim associated with the vehicle 114, the model associated with the vehicle 114, or the type associated with the second electronic key 106. The delay time may be cancelled based on the authentication of the user. For example, based on an input/presentation of the second electronic key 106 by the user to the vehicle 114 and/or the electronic device 102, the circuitry 202 may determine that the second electronic key 106 is valid. Based on the validation of the second electronic key 106, the circuitry 202 may be configured to control the selection of the delay time associated with the operation mode of the vehicle 114, as per requirements of the user. For example, upon the determination that the second electronic key 106 presented by the user is correct, the circuitry 202 may be configured to select the delay time of 1 hour associated with an immobilized state of the vehicle 114. Alternatively, in case the user selects 2 hours as the delay time, the delay time may be set as 2 hours and the vehicle 114 may be set to the immobilized state for the next 2 hours.

At 508, an operation of first vehicle operation mode control state may be executed. In an embodiment, in the first vehicle operation mode control state, the circuitry 202 may be configured to control the operation mode of the vehicle 114 to be set in the immobilized state, based on the selected delay time and the determined first information. For example, in case a new electronic key (e.g., the second electronic key 106) is registered and the delay time for the immobilization of the vehicle 114 (based on the registration of the new electronic key) is set as 1 hour, the circuitry 202 may control the operation mode of the vehicle 114 to be set as the immobilized state for the next 1 hour. The vehicle 114 may remain inoperable for the next 1 hour unless the delay timer is cancelled by an authenticated user or the dealer/manufacturer of the vehicle 114.

At 510, an operation of user authentication (in case of receipt of a user request) may be executed. In an embodiment, the circuitry 202 may be configured to detect, whether a request, of the user associated with the vehicle 114, to mobilize the vehicle 114 is received based on the operation mode of the vehicle 114 being set as the immobilized state. It may be appreciated that the request of the user for setting the operation mode of the vehicle 114 to the mobilized mode may be initiated based on a provision of a valid electronic key of the vehicle 114 by the user, to the vehicle 114 and/or the electronic device 102. For example, the vehicle 114 may be immobilized for the duration of 1 hour. However, the user may return to the vehicle 114 earlier than the end of the 1 hour time. In such a case, the vehicle 114 may detect a user request to unlock and mobilize the vehicle 114 based on a presentation of a genuine electronic key (such as, the second electronic key 106) by the user. The vehicle immobilizer timer 116 may be cancelled, based on the presentation of the genuine electronic key and a successful authentication of the user.

In an embodiment, the circuitry 202 may be configured to authenticate the user, based on the detection of the request of the user associated with the vehicle 114 being received. The authentication of the user may be further based on the determination that the user corresponds to the owner of the vehicle 114. Further, the authentication of the user may be based on the received second information indicative of the proof of ownership of the vehicle 114 by the user. The authentication of the user may be based on the determined third information indicative of the at least one of the secure access or the data connection to the vehicle 114. Further, the authentication of the user may be based on the received fourth information indicative of the secure authentication credential of the user. The secure authentication credential of the user may correspond to the a least one of the secure PIN of the user, the fingerprint of the user, the facial scan of the user, or the authentication code of the user.

At 512, an operation of second vehicle operation mode control state may be executed. In an embodiment, in the first vehicle operation mode control state, the circuitry 202 may be configured to control the operation mode of the vehicle 114 to be set in the mobilized state, based on the at least one of the expiry of the delay time or the authentication of the user. In case a request for cancellation of the delay time is received before an end of the delay time, the circuitry 202 may perform an authentication of the user (as described, for example, at 510). Based on a successful authentication of the user, the operation mode of the vehicle 114 may be set to the mobilized state. The vehicle 114, which is now set in the mobilized state, may become operational (and may also unlock for use).

It should be noted that the exemplary scenario 500 of FIG. 5 is for exemplary purposes and should not be construed to limit the scope of the disclosure.

Figure 6A:
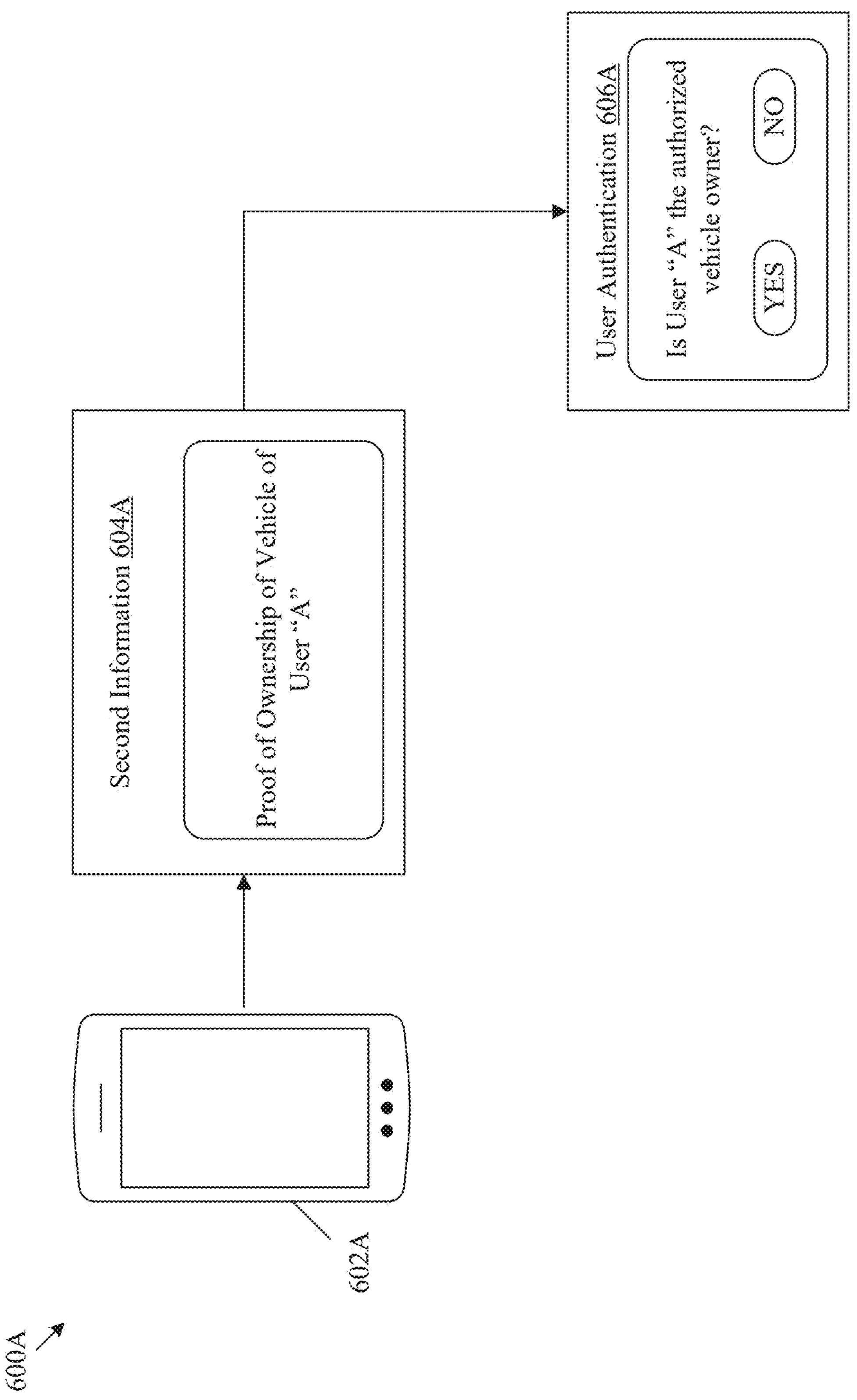
FIG. 6A is a block diagram that illustrates an exemplary scenario of operation of vehicle immobilizer timer based on electronic key learning and determination of second information, in accordance with an embodiment of the disclosure.

FIG. 6A is a block diagram that illustrates an exemplary scenario of operation of vehicle immobilizer timer based on electronic key learning and determination of second information, in accordance with a first embodiment of the disclosure. FIG. 6A is explained in conjunction with elements from FIG. 1, FIG. 2, FIG. 3, FIG. 4, and FIG. 5. With reference to FIG. 6A, there is shown an exemplary scenario 600A of operation of the vehicle immobilizer timer 116 based on the learning of the second electronic key 106 and the determination of the second information. The exemplary scenario 600 includes a computing device 602A, a second information display panel 604A, and a second user authentication panel 606A. The second information display panel 604A and the second user authentication panel 606A may be rendered on the computing device 602A. The computing device 602A may be an electronic device associated with a vehicle dealer, a vehicle manufacturer, or an Original Equipment Manufacturer (OEM). Further, the computing device 602A may be configured to send the second information to the electronic device 102. The second information may be indicative of a proof of ownership of the vehicle 114.

In an example, the computing device 602A may determine whether the user (e.g., a User "A") is a true owner of the vehicle 114, based on the proof of ownership of the vehicle 114 (such as, a registration certificate of the vehicle 114 in the name of the User "A" and an identification certificate of the User "A"). A user associated with the computing device 602A of the vehicle dealer, the vehicle manufacturer, or the OEM may verify the proof of ownership manually or by initiation of an automatic verification (for example, through a department of transport portal of the government). Based on the verification of the proof of ownership, the computing device 602A may transmit the second information indicative of the proof of ownership of the vehicle 114 to the electronic device 102. The electronic device 102 may receive the second information and the authentication of the user by the electronic device 102 may be further based on the received second information.

It should be noted that the exemplary scenario 600A of FIG. 6A is for exemplary purposes and should not be construed to limit the scope of the disclosure.

Figure 6B:
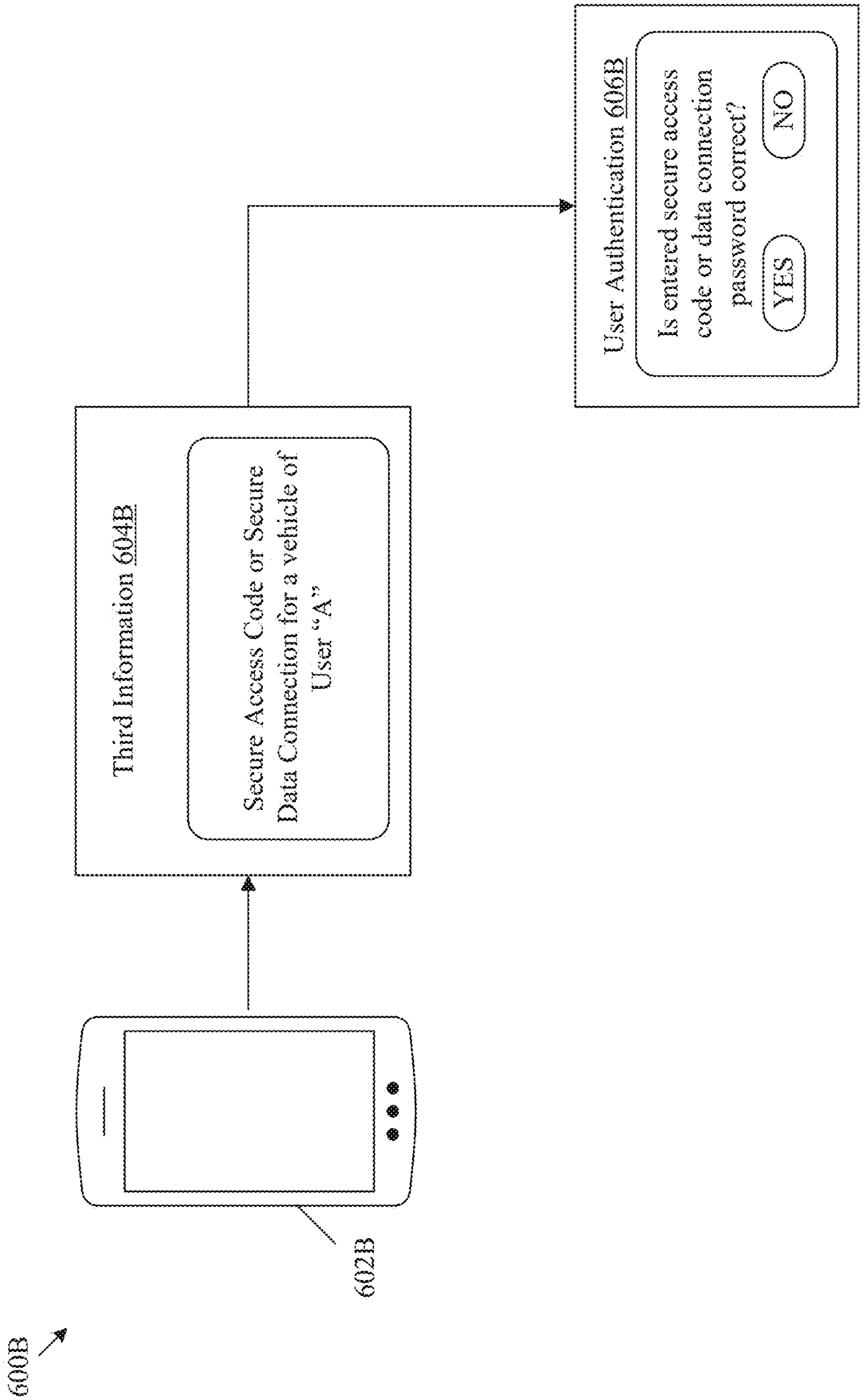
FIG. 6B is a block diagram that illustrates an exemplary scenario of operation of vehicle immobilizer timer based on electronic key learning and determination of third information, in accordance with an embodiment of the disclosure.

FIG. 6B is a block diagram that illustrates an exemplary scenario of operation of the vehicle immobilizer timer based on electronic key learning and determination of third information, in accordance with a second embodiment of the disclosure. FIG. 6B is explained in conjunction with elements from FIG. 1, FIG. 2, FIG. 3, FIG. 4, FIG. 5, and FIG. 6A. With reference to FIG. 6B, there is shown an exemplary scenario 600B of operation of the vehicle immobilizer timer 116 based on the learning of the second electronic key 106 and the determination of the third information. The exemplary scenario 600B includes a computing device 602B, a third information display panel 604B, and a third user authentication panel 606B. The computing device 602B may render the third information display panel 604B and the third user authentication panel 606B. The computing device 602B may correspond to the electronic device 102. As the computing device 602B may be similar to the electronic device 102, details related to the computing device 602B have been omitted herein. The computing device 602B may be an electronic device associated with the user of the vehicle 114. The computing device 602B may be configured to determine the third information indicative of the at least one of the secure access or the data connection to the vehicle 114, based on the electronic device 102.

In an example, the computing device 602B may determine whether the user (e.g., a User "A") of the electronic device 102 (i.e., the electronic device 102) has a secure access or has a data connection to the vehicle 114. The computing device 602B may determine that the electronic device 102 is connected to the vehicle 114, through a secure connection. In such a case, the user of the electronic device 102 may be authenticated, based on the third information indicative of the secure access or the data connection.

It should be noted that the exemplary scenario 600B of FIG. 6B is for exemplary purposes and should not be construed to limit the scope of the disclosure.

Figure 6C:
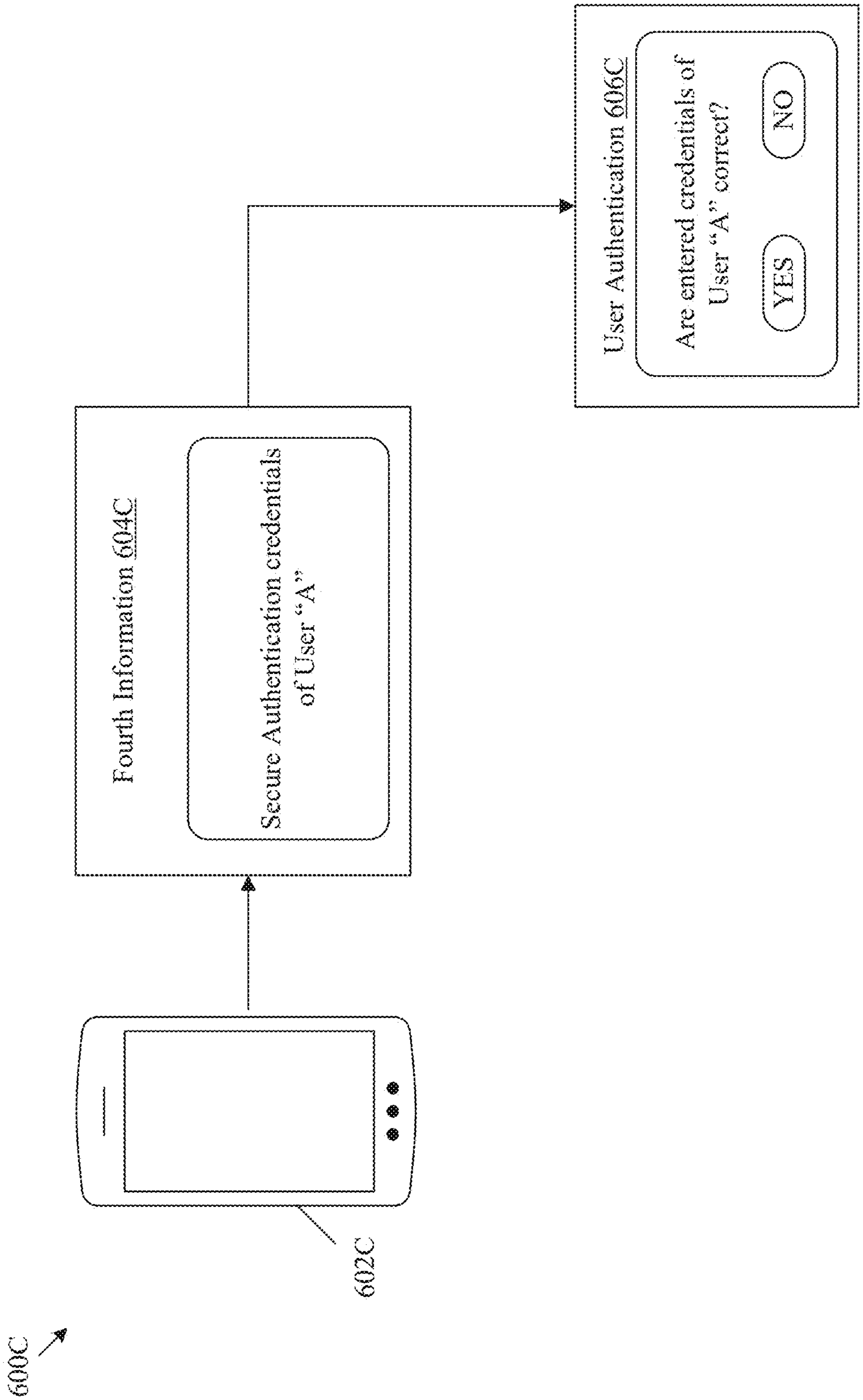
FIG. 6C is a block diagram that illustrates an exemplary scenario of operation of vehicle immobilizer timer based on electronic key learning and determination of fourth information, in accordance with an embodiment of the disclosure.

FIG. 6C is a block diagram that illustrates an exemplary scenario of operation of vehicle immobilizer timer based on electronic key learning and determination of fourth information, in accordance with a third embodiment of the disclosure. FIG. 6B is explained in conjunction with elements from FIG. 1, FIG. 2, FIG. 3, FIG. 4, FIG. 5, FIG. 6A, and FIG. 6B. With reference to FIG. 6C, there is shown an exemplary scenario 6000 of operation of the vehicle immobilizer timer 116 based on the learning of the second electronic key 106 and the determination of the fourth information. The exemplary scenario 6000 includes a computing device 602C, a fourth information display panel 604C, and a fourth user authentication panel 606C. The computing device 602C may render the fourth information display panel 604C and the fourth user authentication panel 606C. The computing device 602C may correspond to the electronic device 102. As the computing device 602C may be similar to the electronic device 102, details related to the computing device 602C have been omitted herein. The computing device 602C may be an electronic device associated with the user of the vehicle 114. The computing device 602C may be configured to receive the fourth information including the secure authentication credential of the user.

In an example, the computing device 602C may receive (via the I/O device 208 or an external device associated with the computing device 602C) the fourth information including the secure authentication credential of the user (e.g., a User "A") of the vehicle 114. In an example, the secure authentication credential of the user may corresponds to at least one of, but not limited to, a secure Personal Identification Number (PIN) of the user, a fingerprint of the user, a facial scan of the user, or an authentication code of the user.

The computing device 602C may perform an authentication of the user, based on the secure authentication credential of the user.

It should be noted that the exemplary scenario 6000 of FIG. 6C is for exemplary purposes and should not be construed to limit the scope of the disclosure.

Figure 7:
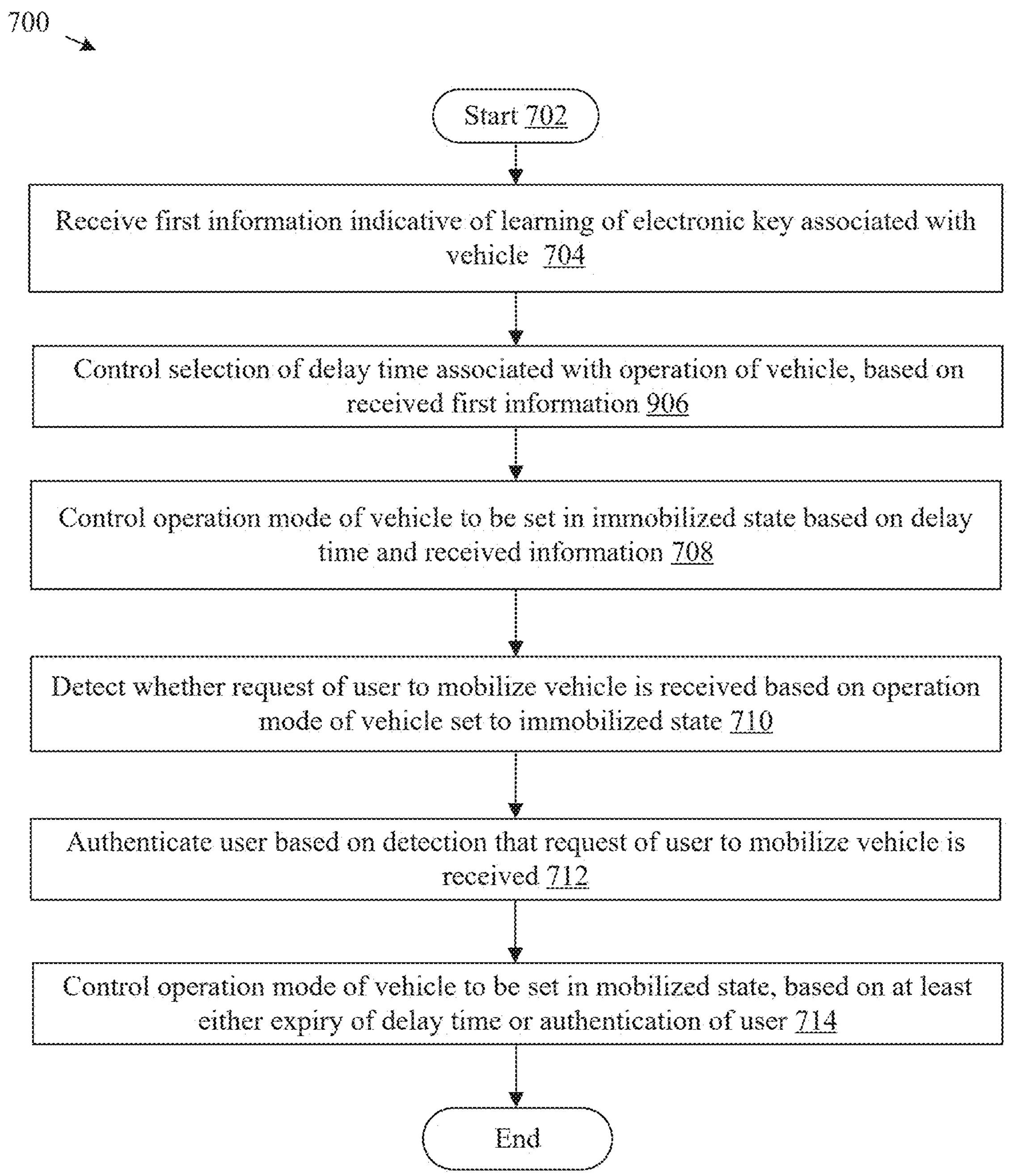
FIG. 7 is a flowchart that illustrates exemplary operations of a method for facilitating operation of vehicle immobilizer timer based on electronic key learning, in accordance with an embodiment of the disclosure.

FIG. 7 is a flowchart that illustrates exemplary operations of a method for facilitating operation of vehicle immobilizer timer based on electronic key learning, in accordance with an embodiment of the disclosure. FIG. 7 is described in conjunction with elements from FIG. 1, FIG. 2, FIG. 3, FIG. 4, FIG. 5, FIG. 6A, FIG. 6B, and, FIG. 6C. With reference to FIG. 7, there is shown an exemplary flowchart 700. The flowchart 700 includes operations from 702 to 714 that may be implemented, for example, by the circuitry 202 of the electronic device 102 of FIG. 2. The operations of the flowchart 700 may start at 702 and proceed to 704.

At 704, the first information indicative of the learning of an electronic key (e.g., the second electronic key 106) associated with the vehicle 114 may be received. The circuitry 202 may be configured to receive the first information associated with the vehicle 114. In an embodiment, the first information may be indicative of the learning of the second electronic key 106 associated with the vehicle 114. Details related to the receipt of the first information indicative of the learning of the electronic key are provided, for example, in FIG. 4 (at 402).

At 706, the selection of the delay time associated with the operation mode of the vehicle 114 may be controlled. The circuitry 202 may be configured to control the selection of the delay time associated with the operation mode of the vehicle 114, based on the received first information. In an embodiment, the control of the selection of the delay time may be based on at least one of the type of market associated with the vehicle 114, the type of trim associated with the vehicle 114, the model associated with the vehicle 114, or the type associated with the first electronic key 104. Details related to the control of the selection of the delay time associated with the operation mode of the vehicle are further provided, for example, in FIG. 4 (at 404).

At 708, the operation mode of the vehicle 114 may be controlled to be set in the immobilized state. The circuitry 202 may be configured to control the operational mode of the vehicle 114 to be set in the immobilized state, based on the delay time and the received first information. Details related to the control of the operation mode of the vehicle to be set in the immobilized state are further provided, for example, in FIG. 4 (at 406).

At 710, it may be detected whether the request of the user associated with the vehicle 114, to mobilize the vehicle 114, is received. The circuitry 202 may be configured to detect whether the request, of the user associated with the vehicle 114, to mobilize the vehicle 114, is received based on the operation mode of the vehicle 114 being set as the immobilized state. Details related to the detection of the user request associated with the vehicle to mobilize the vehicle are further provided, for example, in FIG. 4 (at 408).

At 712, the user may authenticated based on the detection of the received request of the user. The circuitry 202 may authenticate the user, based on the detection that the request of the user associated with the vehicle 114 is received. Herein, the authentication of the user may be based on the determination that the user corresponds to the owner of the vehicle 114. Further, the authentication of the user may be based on the second information, the third information, and/or the fourth information. Details related to the authentication of the user are further provided, for example, in FIG. 4 (at 410).

At 714, the operation mode of the vehicle 114 may be controlled to be set in the mobilized state, based on the at least one of the expiry of the delay time or the authentication of the user. The circuitry 202 may be configured to control the operation mode of the vehicle 114 to be set in the mobilized state, based on the at least one of the expiry of the delay time or the authentication of the user. Herein, a cancelation of the delay time may be controlled based on the authentication of the user. Details related to the control of the operation mode of the vehicle 114 to be set in the mobilized state are further provided, for example, in FIG. 4 (at 412). Control may pass to end.

Although the flowchart 700 is illustrated as discrete operations, such as, 704, 706, 708, 710, 712, and 714 the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 8:
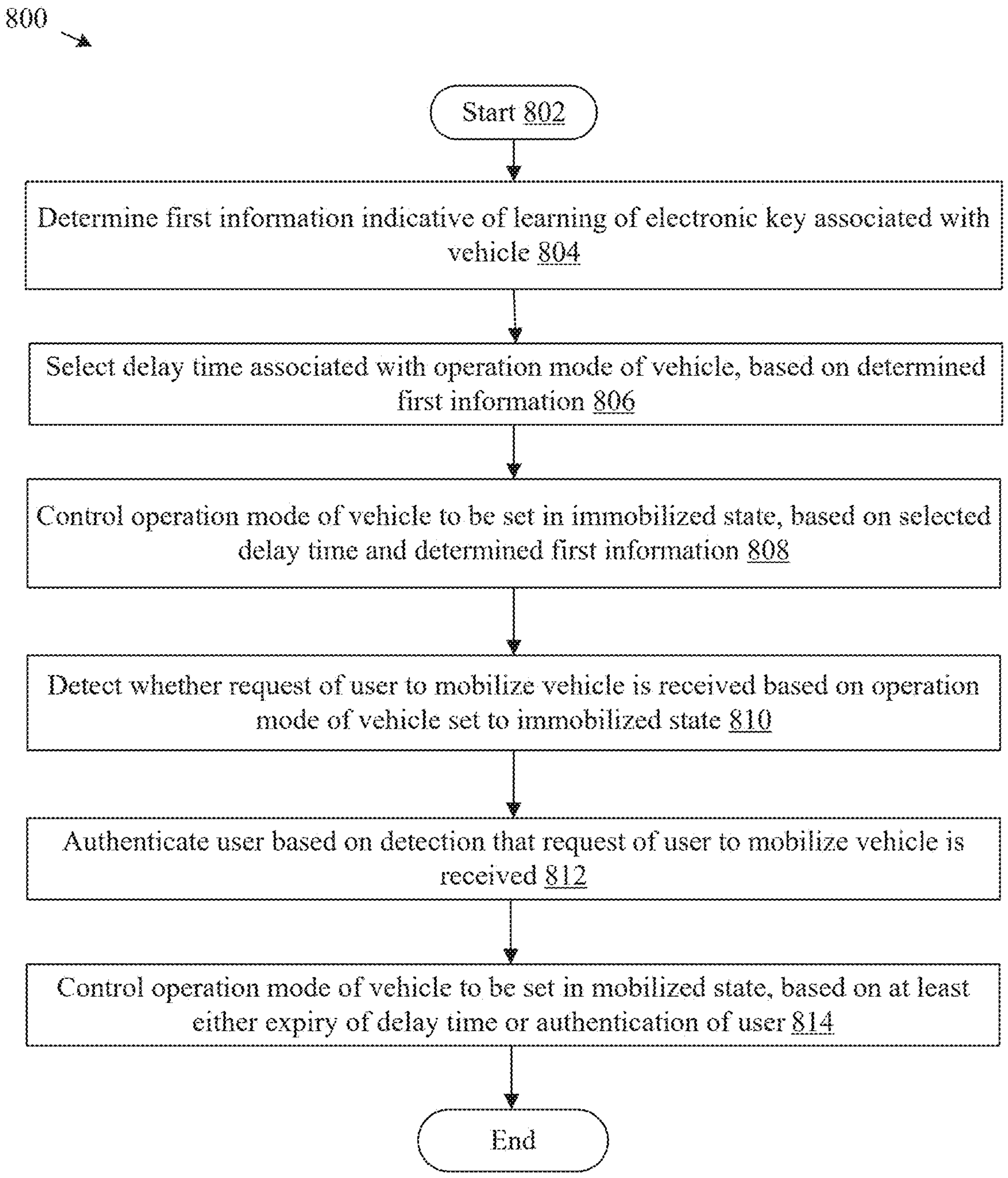
FIG. 8 is a flowchart that illustrates exemplary operations of a method involving a server to facilitate operation of vehicle immobilizer timer based on electronic key learning, in accordance with an embodiment of the disclosure.

FIG. 8 is a flowchart that illustrates exemplary operations of a method involving a server to facilitate operation of vehicle immobilizer timer based on electronic key learning, in accordance with an embodiment of the disclosure. FIG. 8 is described in conjunction with elements from FIG. 1, FIG. 2, FIG. 3, FIG. 4, FIG. 5, FIG. 6A, FIG. 6B, FIG. 6C, and FIG. 7. With reference to FIG. 8, there is shown an exemplary flowchart 800. The flowchart 800 includes operations from 802 to 814 that may be implemented, for example, by a circuitry of the server 108. The operations of the flowchart 800 may start at 802 and proceed to 804.

At 804, the first information indicative of the learning of the electronic key (e.g., the second electronic key 106) associated with the vehicle 114 may be determined. In an embodiment, the circuitry of the server 108 may be configured to determine the first information associated with the vehicle 114. The determined first information may be indicative of the learning of the second electronic key 106 associated with the vehicle 114. The vehicle 114 may be associated with the server 108. It may be appreciated that the first information 122A or the data related with the first electronic key 104 may be stored in the database 110. The circuitry of the server 108 may receive an indication that a new electronic key (e.g., the second electronic key 106) has been learned from a computing device of a dealer, a manufacturer, or an OEM of the vehicle 114. Based on the received indication, the circuitry of the server 108 may determine the first information. The first information may include an identification (e.g., a vehicle identification number or vehicle number plate) of the vehicle 114 and identification details related to the second electronic key 106. The circuitry of the server 108 may store the determined first information as the second key information 118B on the database 110. The database 110 may be queried for the second key information 118B by the circuitry 202 of electronic device 102 and/or the ECU 304 of the vehicle 114. Details related to determination of the first information are further provided, for example, in FIG. 4 (at 402).

At 806, the delay time associated with the operation mode of the vehicle 114 may be selected. In an embodiment, the circuitry of the server 108 may be configured to select the delay time associated with the operation mode of the vehicle 114, based on the determined first information. It may be appreciated that the selection of the delay time may be based on vehicle data including at least one of the type of market associated with the vehicle 114, the type of trim associated with the vehicle 114, the model associated with the vehicle 114, or the type associated with the second electronic key 106. In an embodiment, the vehicle data may be stored on the database 110 and may be queried by the server 108 to select the delay time. The delay time may be cancelled based on the authentication of the user. Details related to selection of the delay time associated with the operation mode of the vehicle are further provided, for example, in FIG. 4 (at 404).

At 808, the operation mode of the vehicle 114 may be controlled to be set in the immobilized state. In an embodiment, the circuitry of the server 108 may be configured to control the operation mode of the vehicle 114 to be set in the immobilized state, based on the selected delay time and the determined first information. For example, the circuitry of the server 108 may set the delay time to 1 hour and cause the vehicle 114 to enter the immobilized state for the duration of 1 hour. Details related to the control of the operation mode of the vehicle to be set in the immobilized state are further provided, for example, in FIG. 4 (at 406).

At 810, it may be detected whether the request of the user associated with the vehicle 114, to mobilize the vehicle 114, is received. In an embodiment, the circuitry of the server 108 may be configured to detect, whether the request, of the user associated with the vehicle 114, to mobilize the vehicle 114 is received based on the operation mode of the vehicle 114 being set as the immobilized state. It may be appreciated that the request of the user for setting the operation mode of the vehicle 114 to the mobilized mode may be initiated based on a presentation of a valid electronic key of the vehicle 114 by the user, to request a change of the operation mode of the vehicle 114 from the immobilized state to the mobilized state. For example, the vehicle 114 is immobilized for the duration of 1 hour and the user comes back within the duration. In such a case, the circuitry of the server may detect whether the user provides a correct electronic key (e.g., the second electronic key 106) of the vehicle 114 to bring the vehicle 114 in the mobilized state. Details related to the detection of the user request associated with the vehicle to mobilize the vehicle are further provided, for example, in FIG. 4 (at 408).

At 812, the user may be authenticated, based on the detection that the request of the user to mobilize the vehicle 114 is received. In an embodiment, the circuitry of the server 108 may be configured to authenticate the user, based on the detection that the request of the user associated with the vehicle 114 to mobilize the vehicle 114 is received. The authentication of the user may be further based on the determination that the user corresponds to the owner of the vehicle 114. Further, the authentication of the user may be based on the received second information indicative of the proof of ownership of the vehicle 114 by the user. The authentication of the user may be based on the determined third information indicative of the at least one of the secure access or the data connection to the vehicle 114. Further, the authentication of the user may be based on the received fourth information indicative of the secure authentication credential of the user. The secure authentication credential of the user may correspond to the a least one of the secure PIN of the user, the fingerprint of the user, the facial scan of the user, or the authentication code of the user. Details related to the authentication of the user based on the detection of the request being received are further provided, for example, in FIG. 4 (at 410).

At 814, the operation mode of the vehicle 114 may be controlled to be set in the mobilized state, based on the at least one of the expiry of the delay time or the authentication of the user. In an embodiment, the circuitry of the server 108 may be configured to control the operation mode of the vehicle 114 to be set in the mobilized state, based on the at least one of the expiry of the delay time or the authentication of the user. Details related to the control of the operation mode of the vehicle to be set in the mobilized state are further provided, for example, in FIG. 4 (at 412). Control may pass to end.

Although the flowchart 800 is illustrated as discrete operations, such as, 804, 806, 808, 810, 812, and 814 the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer (such as, the circuitry 202). The instructions may cause the machine and/or computer (for example, the electronic device 102) to perform operations that may include receiving first information indicative of a learning of an electronic key (e.g., the second electronic key 106) associated with a vehicle (e.g., the vehicle 114). The operations may further include controlling a selection of a delay time associated with an operation mode of the vehicle 114, based on the received first information. The operations may further include controlling the operational mode of the vehicle 114 to be set in an immobilized state, based on the delay time and the received first information. The operations may further include detecting whether a request of the user associated with the vehicle 114 to mobilize the vehicle 114 is received, based on the operation mode of the vehicle 114 being set as the immobilized state. The operations may further include authenticating the user, based on the detection that the request of the user associated with the vehicle 114 is received. The operations may further include controlling the operation mode of the vehicle 114 to be set in a mobilized state, based on the at least one of the expiry of the delay time or the authentication of the user.

Various embodiments of the disclosure may provide a non-transitory, computer-readable medium and/or storage medium, and/or a non-transitory machine readable medium and/or storage medium stored thereon, a set of instructions executable by a machine and/or a computer (such as, the circuitry 202 of the vehicle 114). The instructions may cause the machine and/or computer (for example, the electronic control unit (ECU) 304 of the vehicle 114) to perform operations that include determining the first information indicative of the learning of the first electronic key 104 associated with the vehicle 114. The vehicle 114 may be further associated with the server 108. The operations may further include selecting the delay time associated with the operation mode of the vehicle 114, based on the determined first information. The operations may further include controlling the operation mode of the vehicle 114 to be set in the immobilized state, based on the selected delay time and the determined first information. The operations may further include detecting, whether the request, of the user associated with the vehicle 114, to mobilize the vehicle 114 is received based on the operation mode of the vehicle 114 being set as the immobilized state. The operations may further include authenticating the user, based on the detection of the request of the user associated with the vehicle 114 being received. The operations may further include controlling the operation mode of the vehicle 114 to be set in the mobilized state, based on the at least one of the expiry of the delay time or the authentication of the user.

Various embodiments of the disclosure may provide a non-transitory, computer-readable medium and/or storage medium, and/or a non-transitory machine readable medium and/or storage medium stored thereon, a set of instructions executable by a machine and/or a computer (such as, circuitry of the server 108). The instructions may cause the machine and/or computer (for example, the server 108) to perform operations that may include receiving first information indicative of a learning of an electronic key (e.g., the second electronic key 106) associated with a vehicle (e.g., the vehicle 114). The operations may further include controlling a selection of a delay time associated with an operation mode of the vehicle 114, based on the received first information. The operations may further include controlling the operational mode of the vehicle 114 to be set in an immobilized state, based on the delay time and the received first information. The operations may further include detecting whether a request of the user associated with the vehicle 114 to mobilize the vehicle 114 is received, based on the operation mode of the vehicle 114 being set as the immobilized state. The operations may further include authenticating the user, based on the detection that the request of the user associated with the vehicle 114 is received. The operations may further include controlling the operation mode of the vehicle 114 to be set in a mobilized state, based on the at least one of the expiry of the delay time or the authentication of the user.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system may be able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it may be intended that the present disclosure may be not limited to the particular embodiment disclosed, but that the present disclosure will include all embodiments that fall within the scope of the appended claims.

What is claimed is:

1. An electronic device, comprising:
circuitry configured to:
receive first information indicative of a learning of an electronic key associated with a vehicle;
control a selection of a delay time associated with an operation mode of the vehicle, based on the received first information;
control the operation mode of the vehicle to be set in an immobilized state based on the delay time and the received first information;
detect whether a request, of a user associated with the vehicle, to mobilize the vehicle is received based on the operation mode of the vehicle being set as the immobilized state;
authenticate the user, based on the detection that the request is received; and
control the operation mode of the vehicle to be set in a mobilized state, based on at least one of the expiry of the delay time or the authentication of the user.

2. The electronic device according to claim 1, wherein the circuitry is further configured to:
determine whether the user corresponds to an owner of the vehicle, wherein
the authentication of the user is further based on the determination that the user corresponds to the owner of the vehicle.

3. The electronic device according to claim 1, wherein the circuitry is further configured to control a cancelation of the delay time, based on the authentication of the user.

4. The electronic device according to claim 1, wherein the circuitry is further configured to:
receive, from a computing device associated with a manufacturer or a dealer of the vehicle, second information indicative of a proof of ownership of the vehicle by the user, wherein
the authentication of the user is further based on the received second information.

5. The electronic device according to claim 1, wherein the circuitry is further configured to:
determine third information indicative of at least one of a secure access or a data connection to the vehicle, based on the electronic device, wherein
the authentication of the user is further based on the determined third information.

6. The electronic device according to claim 1, wherein the circuitry is further configured to:
receive fourth information including a secure authentication credential of the user, wherein
the authentication of the user is further based on the received fourth information.

7. The electronic device according to claim 6, wherein the secure authentication credential of the user corresponds to at least one of a secure Personal Identification Number (PIN) of the user, a fingerprint of the user, a facial scan of the user, or an authentication code of the user.

8. The electronic device according to claim 1, wherein the control of the selection of the delay time is based on at least one of: a type of market associated with the vehicle, a type of trim associated with the vehicle, a model associated with the vehicle, or a type associated with the electronic key.

9. The system according to claim 1, wherein the circuitry is further configured to receive a location associated with the vehicle, wherein the control of the selection of the delay time is based on the received location.

10. A vehicle, comprising:

an electronic control unit (ECU) configured to:

receive first information indicative of a learning of a new electronic key associated with the vehicle;

control a selection of a delay time associated with an operation mode of the vehicle, based on the received first information;

control the operation mode of the vehicle to be set in an immobilized state based on the delay time and the received first information;

detect whether a request, of a user associated with the vehicle, to mobilize the vehicle is received based on the operation mode of the vehicle being set as the immobilized state;

authenticate the user, based on the detection of the request is received; and control the operation mode of the vehicle to be set in a mobilized state, based on at least one of the expiry of the delay time or the authentication of the user.

11. The vehicle according to claim 10, wherein the ECU is further configured to determine whether the user corresponds to an owner of the vehicle, wherein the authentication of the user is further based on the determination that the user corresponds to the owner of the vehicle.

12. The vehicle according to claim 10, wherein the ECU is further configured to control a cancelation of the delay time, based on the authentication of the user.

13. The vehicle according to claim 10, wherein the ECU is further configured to:

receive, from a computing device associated with a manufacture of a dealer of the vehicle, second information indicative of a proof of ownership of the vehicle by the user, wherein the authentication of the user is further based on the received second information.

14. The vehicle according to claim 10, wherein the ECU is further configured to:

determine third information indicative of at least one of a secure access or a data connection to the vehicle, based on the electronic device, wherein the authentication of the user is further based on the determined third information.

15. The vehicle according to claim 10, wherein the ECU is further configured to:

receive fourth information including a secure authentication credential of the user, wherein the authentication of the user is further based on the received fourth information.

16. The vehicle according to claim 15, wherein the secure authentication credential of the user corresponds to at least one of a secure Personal Identification Number (PIN) of the user, a fingerprint of the user, a facial scan of the user, or an authentication code of the user.

17. The vehicle according to claim 10, wherein the control of the selection of the delay time is based on at least one of: a type of market associated with the vehicle, a type of trim associated with the vehicle, a model associated with the vehicle, or a type associated with the electronic key.

18. The vehicle according to claim 10, wherein the ECU is further configured to:

receive a location associated with the vehicle, wherein the control of the selection of the delay time is based on the received location.

19. A server, comprising:

circuitry configured to:

determine first information indicative of a learning of an electronic key associated with a vehicle, the vehicle being further associated with the server;

select a delay time associated with an operation mode of the vehicle, based on the determined first information;

control the operation mode of the vehicle to be set in an immobilized state based on the selected delay time and the determined first information;

detect whether a request, of a user associated with the vehicle, to mobilize the vehicle is received based on the operation mode of the vehicle being set as the immobilized state;

authenticate the user, based on the detection of the request being received; and control the operation mode of the vehicle to be set in a mobilized state, based on at least one of the expiry of the delay time or the authentication of the user.

20. The server according to claim 19, wherein the selection of the delay time is based on at least one of: a type of market associated with the vehicle, a type of trim associated with the vehicle, a model associated with the vehicle, or a type associated with the electronic key.

* * * * *